US012548400B1

(12) United States Patent
Park

(10) Patent No.: US 12,548,400 B1
(45) Date of Patent: *Feb. 10, 2026

(54) UNIVERSAL PROGRESS TRACKING AND REWARD REDEMPTION MECHANISMS IN GAMING PLATFORMS

(71) Applicant: Betty Gaming, Inc., New York, NY (US)

(72) Inventor: Justin Park, New York, NY (US)

(73) Assignee: Betty Gaming, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/184,881

(22) Filed: Apr. 21, 2025

Related U.S. Application Data

(63) Continuation of application No. 18/954,290, filed on Nov. 20, 2024, now Pat. No. 12,315,332.

(51) Int. Cl.
*G07F 17/32* (2006.01)

(52) U.S. Cl.
CPC ...... *G07F 17/3225* (2013.01); *G07F 17/3244* (2013.01)

(58) Field of Classification Search
CPC ......................... G07F 17/3225; G07F 17/3244
USPC ........................................................... 463/25
See application file for complete search history.

(56) References Cited

U.S. PATENT DOCUMENTS

| | | | | |
|---|---|---|---|---|
| 10,332,125 | B1 | 6/2019 | Fan et al. | |
| 2008/0234046 | A1* | 9/2008 | Kinsley | G06F 21/10 463/40 |
| 2012/0130853 | A1* | 5/2012 | Petri | G06Q 30/0609 705/26.35 |
| 2014/0274349 | A1* | 9/2014 | Spencer | G07F 17/3234 463/27 |

(Continued)

FOREIGN PATENT DOCUMENTS

KR 10-2013-0100546 A 9/2013

OTHER PUBLICATIONS

Written Opinion of the International Searching Authority in relation to International Application No. PCT/US2025/041930, dated Dec. 5, 2025, 7 pages.

(Continued)

*Primary Examiner* — Pierre E Elisca
(74) *Attorney, Agent, or Firm* — Taylor Dykema PLLC; Eric Kleinertz

(57) ABSTRACT

A system includes a gaming platform hosting a plurality of games, each having the same or different game mechanic. The gaming platform displays a universal progress metric at a user interface (UI) of the plurality of games, which tracks cumulative progress across all games. The universal progress metric is updated/synchronized in real-time with progress made by the player in any of the games according to the corresponding game mechanics. A rewards distribution module calculates and distributes rewards based on universal progress metric, such as at least one of in-game prizes/bonuses, off-game/meta-game prizes/rewards, and/or real- (Continued)

world prizes. Players are allocated soft currency based on the universal progress metric, which are redeemed for the rewards, thereby allowing the players to redeem/obtain rewards in any of the games based on progress made in the same or different games in the gaming platform.

20 Claims, 21 Drawing Sheets

(56) References Cited

U.S. PATENT DOCUMENTS

| | | | | |
|---|---|---|---|---|
| 2017/0032620 | A1 | 2/2017 | Lempel et al. | |
| 2018/0108212 | A1 | 4/2018 | Knutsson | |
| 2019/0188967 | A1* | 6/2019 | Giuffria | G07F 17/3295 |
| 2019/0266846 | A1 | 8/2019 | Seleznov et al. | |
| 2020/0402367 | A1* | 12/2020 | Oberberger | G07F 17/3223 |
| 2023/0306819 | A1* | 9/2023 | Oberberger | G07F 17/3269 |
| 2023/0394923 | A1* | 12/2023 | DeBrabander | G07F 17/3267 |

OTHER PUBLICATIONS

Combined Search Report under Section 17(5)(b) and Abbreviated Examination Report under Section 18(3) in relation to UK Patent Application No. GB2513842.1, dated Nov. 14, 2024, 7 pages.

* cited by examiner

OPEN BY TAPPING THE BETTY BOX

INTERRUPTS PLAY ON COMPLETION OF A STATUS

400

| | New | |
|---|---|---|
| | Segments | Weightings |
| 20 | 200 | 300 |
| 50 | 500 | 1300 |
| 100 | 1,000 | 1400 |
| 200 | 2,000 | 1500 |
| 300 | 3,000 | 1500 |
| 500 | 5,000 | 1500 |
| 700 | 7,000 | 1400 |
| 1,000 | 10,000 | 1300 |
| 5,000 | 50,000 | 300 |
| 20,000 | 200,000 | 11 |

FIG. 4

500

| Level | XP | Coins Rewarded | Cash Required (100XP) | Cash Equiv. Rewarded | Level RTP | Cumm.Cash Bet | Cumm. Coins Won | Cumm. Cash Won |
|---|---|---|---|---|---|---|---|---|
| 1 | 8 | 1 | $0.08 | $0.00 | 0.1250% | $0.08 | 1 | $0.00 |
| 2 | 8 | 230 | $0.08 | $0.02 | 28.7500% | $0.16 | 231 | $0.02 |
| 3 | 9 | 245 | $0.09 | $0.02 | 27.2222% | $0.25 | 476 | $0.05 |
| 4 | 10 | 260 | $0.10 | $0.03 | 26.0000% | $0.35 | 736 | $0.07 |
| 5 | 11 | 275 | $0.11 | $0.03 | 25.0000% | $0.46 | 1011 | $0.10 |
| 6 | 12 | 290 | $0.12 | $0.03 | 24.1667% | $0.58 | 1301 | $0.13 |
| 7 | 13 | 305 | $0.13 | $0.03 | 23.4615% | $0.71 | 1606 | $0.16 |
| 8 | 14 | 320 | $0.14 | $0.03 | 22.3333% | $0.85 | 1926 | $0.19 |
| 9 | 15 | 335 | $0.15 | $0.03 | 25.0000% | $1.00 | 2261 | $0.23 |
| 10 | 14 | 350 | $0.14 | $0.04 | 0.5000% | $1.14 | 2611 | $0.26 |
| 11 | 736 | 368 | $7.36 | $0.04 | 0.5000% | $8.50 | 2979 | $0.30 |
| 12 | 782 | 391 | $7.82 | $0.04 | 0.5000% | $16.32 | 3370 | $0.34 |
| 13 | 828 | 414 | $8.28 | $0.04 | 0.5000% | $24.60 | 3784 | $0.38 |
| 14 | 874 | 437 | $8.74 | $0.04 | 0.5000% | $33.34 | 4221 | $0.42 |
| 15 | 920 | 460 | $9.20 | $0.05 | 0.5000% | $42.54 | 4681 | $0.47 |
| 16 | 966 | 483 | $9.66 | $0.05 | 0.5000% | $52.20 | 5164 | $0.52 |
| 17 | 1012 | 506 | $10.12 | $0.05 | 0.5000% | $62.32 | 5670 | $0.57 |
| 18 | 1058 | 529 | $10.58 | $0.05 | 0.5000% | $72.90 | 6199 | $0.62 |
| 19 | 1104 | 552 | $11.04 | $0.06 | 0.5000% | $83.94 | 6751 | $0.68 |
| 20 | 1150 | 575 | $11.50 | $0.06 | 0.5000% | $95.44 | 7326 | $0.73 |
| 21 | 1196 | 598 | $11.96 | $0.06 | 0.5000% | $107.40 | 7924 | $0.79 |
| 22 | 1242 | 621 | $12.42 | $0.06 | 0.5000% | $119.82 | 8545 | $0.85 |
| 23 | 1288 | 644 | $12.88 | $0.06 | 0.5000% | $132.70 | 9189 | $0.92 |

FIG. 5

| | | | | | | | | |
|---|---|---|---|---|---|---|---|---|
| 24 | 1334 | 667 | $13.34 | $0.07 | 0.5000% | $146.04 | 9856 | $0.99 |
| 25 | 1380 | 690 | $13.80 | $0.07 | 0.5000% | $159.84 | 10546 | $1.05 |
| 26 | 1426 | 713 | $14.26 | $0.07 | 0.5000% | $174.10 | 11259 | $1.13 |
| 27 | 1472 | 736 | $14.72 | $0.07 | 0.5000% | $188.82 | 11995 | $1.20 |
| 28 | 1518 | 759 | $15.18 | $0.07 | 0.5000% | $204.00 | 12754 | $1.28 |
| 29 | 1564 | 782 | $15.64 | $0.08 | 0.5000% | $219.64 | 13536 | $1.35 |
| 30 | 1610 | 805 | $16.10 | $0.08 | 0.5000% | $235.74 | 14341 | $1.43 |
| 31 | 1656 | 828 | $16.56 | $0.08 | 0.5000% | $252.30 | 15169 | $1.52 |
| 32 | 1702 | 851 | $17.02 | $0.08 | 0.5000% | $269.32 | 16020 | $1.60 |
| 33 | 1748 | 874 | $17.48 | $0.09 | 0.5000% | $286.80 | 16894 | $1.69 |
| 34 | 1794 | 897 | $17.94 | $0.09 | 0.5000% | $304.74 | 17791 | $1.78 |
| 35 | 1840 | 920 | $18.40 | $0.09 | 0.5000% | $323.14 | 18711 | $1.87 |
| 36 | 1886 | 943 | $18.86 | $0.09 | 0.5000% | $342.00 | 19654 | $1.97 |
| 37 | 1932 | 966 | $19.32 | $0.10 | 0.5000% | $361.32 | 20620 | $2.064 |
| 38 | 1978 | 989 | $19.78 | $0.10 | 0.5000% | $381.10 | 21609 | $2.16 |
| 39 | 2024 | 1012 | $20.24 | $0.10 | 0.5000% | $401.34 | 22621 | $2.26 |
| 40 | 2070 | 1035 | $20.70 | $0.10 | 0.5000% | $422.04 | 23656 | $2.37 |
| 41 | 2116 | 1058 | $21.16 | $0.11 | 0.5000% | $443.20 | 24714 | $2.47 |
| 42 | 2162 | 1081 | $21.62 | $0.11 | 0.5000% | $464.82 | 25795 | $2.58 |
| 43 | 2208 | 1104 | $22.08 | $0.11 | 0.5000% | $486.90 | 26899 | $2.69 |
| 44 | 2254 | 1127 | $22.54 | $0.11 | 0.5000% | $509.44 | 28026 | $2.80 |
| 45 | 2300 | 1150 | $23.00 | $0.12 | 0.5000% | $532.44 | 29176 | $2.92 |
| 46 | 2346 | 1173 | $23.46 | $0.12 | 0.5000% | $555.44 | 30349 | $3.03 |
| 47 | 2392 | 1196 | $23.92 | $0.12 | 0.5000% | $579.82 | 31545 | $3.15 |
| 48 | 2438 | 1219 | $24.38 | $0.12 | 0.5000% | $604.20 | 32764 | $3.28 |
| 49 | 2484 | 1242 | $24.84 | $0.12 | 0.5000% | $629.04 | 34006 | $3.40 |
| 50 | 2530 | 1265 | $25.30 | $0.13 | 0.5000% | $654.34 | 35271 | $3.53 |

FIG. 5 (Continued)

700A 702 704

| Multiplier | 1 | 5 | 10 | 12 | 15 | 20 | 25 | 30 | 40 | |
|---|---|---|---|---|---|---|---|---|---|---|
| **Base Wheel** | **Member** | **Amethyst** | **Topaz** | **Aquamarine** | **Opal** | **Emerald** | **Ruby** | **Sapphire** | **Diamond** | **Weighting** |
| 20 | 20 | 100 | 200 | 240 | 300 | 400 | 500 | 600 | 800 | 300 |
| 50 | 50 | 250 | 500 | 600 | 750 | 1000 | 1250 | 1500 | 2000 | 1300 |
| 100 | 100 | 500 | 1000 | 1200 | 1500 | 2000 | 2500 | 3000 | 4000 | 1400 |
| 200 | 200 | 1000 | 2000 | 2400 | 3000 | 4000 | 5000 | 6000 | 8000 | 1500 |
| 300 | 300 | 1500 | 3000 | 3600 | 4500 | 6000 | 7500 | 9000 | 12000 | 1500 |
| 500 | 500 | 2500 | 5000 | 6000 | 7500 | 10000 | 12500 | 15000 | 20000 | 1500 |
| 700 | 700 | 3500 | 7000 | 8400 | 10500 | 14000 | 17500 | 21000 | 28000 | 1400 |
| 1000 | 1000 | 5000 | 10000 | 12000 | 15000 | 20000 | 25000 | 30000 | 40000 | 1300 |
| 5000 | 5000 | 25000 | 50000 | 60000 | 75000 | 100000 | 125000 | 150000 | 200000 | 300 |
| 20000 | 20000 | 100000 | 200000 | 240000 | 300000 | 400000 | 500000 | 600000 | 800,000 | 11 |
| Average Hit | 543 | 2717 | 5433 | 6520 | 8150 | 10867 | 13583 | 16300 | 21733 | |
| Average Hit ($) | $0.05 | $0.27 | $0.54 | $0.65 | $0.82 | $1.09 | $1.36 | $1.63 | $2.17 | |
| | | | | | | | | | | |
| | Base Daily Wheel: | **543** | Note the 8x Daily Wheel is the Current Daily Wheel | | | | | | | |

FIG. 7A

706

| Status Level | 28-Day Min Spend | 28-Day Max Spend | Daily Wheel Multiplier | Avg Daily Wheel Prize | Max RTP if 1 Day Active | Min RTP if 1 Day Active | Max RTP if 12 Day Active | Min RTP if 12 Day Active | Max RTP if 28 Day Active | Min RTP if 28 Day Active |
|---|---|---|---|---|---|---|---|---|---|---|
| Member | $0 | $1 | 1 | $0.05 | - | 5.43% | - | 65.20% | - | 152.13% |
| Amethyst | $10 | $80 | 5 | $0.27 | 2.72% | 0.34% | 32.60% | 4.08% | 76.07% | 9.51% |
| Topaz | $50 | $250 | 10 | $0.54 | 1.09% | 0.22% | 13.04% | 2.61% | 30.43% | 6.09% |
| Aquamarine | $150 | $700 | 12 | $0.65 | 0.43% | 0.09% | 5.22% | 1.12% | 12.17% | 2.61% |
| Opal | $400 | $2,000 | 15 | $0.82 | 0.20% | 0.04% | 2.45% | 0.49% | 5.71% | 1.14% |
| Emerald | $1,000 | $5,000 | 20 | $1.09 | 0.11% | 0.02% | 1.30% | 0.26% | 3.04% | 0.61% |
| Ruby | $3,000 | $15,000 | 25 | $1.36 | 0.05% | 0.01% | 0.54% | 0.11% | 1.27% | 0.25% |
| Sapphire | $9,000 | $50,000 | 30 | $1.63 | 0.02% | 0.00% | 0.22% | 0.04% | 0.51% | 0.09% |
| Diamond | $20,000 | - | 40 | $2.17 | 0.01% | - | 0.13% | - | 0.30% | - |
| | | | | | | | | | | |
| VIP | - | - | 50 | | | | | | | |

FIG. 7A
(Continued)

700B

706

| Status | Time Limit | Number of Boxes to Retain Status | Number of Boxes to Increase Status | Perks |
|---|---|---|---|---|
| Member | 28 Days | n/a | 1 | Member Betty Box Rewards<br>Member Daily Wheel |
| Amethyst | 28 Days | 1 | 5 | Amethyst Betty Box Rewards<br>Amethyst Daily Wheel |
| Topaz | 28 Days | 1 | 5 | Topaz Betty Box Rewards<br>Topaz Daily Wheel |
| Aquamarine | 28 Days | 1 | 5 | Aquamarine Betty Box Rewards<br>Aquamarine Daily Wheel |
| Opal | 28 Days | 1 | 5 | Opal Betty Box Rewards<br>Opal Daily Wheel |
| Emerald | 28 Days | 1 | 5 | Emerald Betty Box Rewards<br>Emerald Daily Wheel |
| Ruby | 28 Days | 1 | 5 | Ruby Betty Box Rewards<br>Ruby Daily Wheel |
| Sapphire | 28 Days | 1 | n/a | Sapphire Betty Box Rewards<br>Sapphire Daily Wheel |
| Diamond | 28 Days | 1 | n/a | Diamond Betty Box Rewards<br>Diamond Daily Wheel |

FIG. 7B

UNIVERSAL PROGRESS TRACKING AND REWARD REDEMPTION MECHANISMS IN GAMING PLATFORMS

CROSS-REFERENCE TO RELATED APPLICATION

The present application is a continuation application of and claims the benefit of U.S. patent application Ser. No. 18/954,290 for UNIVERSAL PROGRESS TRACKING AND REWARD REDEMPTION MECHANISMS IN GAMING PLATFORMS, filed Nov. 20, 2024, the entire contents of which are incorporated herein by reference.

FIELD OF THE DISCLOSURE

The present disclosure is generally directed to a gaming platform, and more specifically relates to universal progress tracking and reward redemption mechanisms in a gaming platform having a plurality of games and a User Interface (UI).

INTRODUCTION

Traditional gaming platforms often feature static user interfaces that fail to capture, combine, and display progress made by players in multiple games provided on gaming platforms. These interfaces lack dynamic elements and real-time feedback on the universal progress made by the player, resulting in a monotonous and unengaging player experience. Additionally, existing reward schemes are often ineffective in providing meaningful incentives for players. Furthermore, existing gaming platforms do not have means to allow progress made in one game to be used to redeem/receive rewards in another game, which diminishes the overall appeal of the game and negatively impacts player satisfaction. Such cross-interaction between the games is often not included within game mechanics of each of the games on the gaming platform.

In some gaming platforms, rewards earned through normal gameplay are not sufficiently integrated into the overall gaming experience. Players often lack meaningful ways to utilize these points, rendering them virtually useless. The disconnect between earning and redeeming rewards undermines the incentive to accumulate points and reduces the perceived value of in-game achievements. Moreover, existing gaming platforms frequently suffer from inconsistent reward distribution, where rewards are either too infrequent or too abundant, which can lead to an imbalanced gaming experience, where players either feel unrewarded for their efforts or overwhelmed by excessive rewards (which may cause the player to lose motivation if the same or more incentives are not provided to the players). Such imbalances detract from the overall enjoyment and challenge of the game, leading to player dissatisfaction.

Existing reward schemes often offer limited options for redeeming earned points or rewards in games. Additionally, many traditional reward schemes adopt a one-size-fits-all approach, failing to consider the diverse preferences of different players. This generic approach does not provide motivation and interest to individual players, resulting in a less personalized and engaging reward experience.

Hence, there is a need for universal progress tracking of the players across a plurality of games on a gaming platform and a leveling system to allow cross-redemption of progress points for rewards in a plurality of games on a gaming platform.

SUMMARY

Aspects of the example implementations may include a method for tracking universal progress of a player across a plurality of games provided on a gaming platform, using a progress bar. The progress bar appears at the top of each game in the gaming platform and tracks a cumulative progress of the player across all games. Whenever the player engages with any of the plurality of games, progress made through their actions according to game mechanics associated with the game is reflected through the progress bar. Such integration ensures that the progress of the player is continuously monitored and updated in real-time, and universal progress is made accessible to the players, irrespective of the game being played. The progress bar is synchronized using a centralized server or cloud-based system or calculated on a payment-freed apparatus or an electronic device in which the gaming platform is implemented. For example, the centralized server may be a host server associated with a back end of the gaming platform. The synchronized updates provide instant feedback, keeping the player informed of their current status and universal progress across all games.

Additional aspects of the example implementations may include a method for providing different rewards to the player based on universal progress made by the player across a plurality of games provided on a gaming platform. The method allows the players to exchange/redeem points indicated by a universal progress bar for rewards, such as real-world prizes. For providing different rewards, the method may include accumulating points/units/metrics corresponding to progress made by the players in each game. Further, the method includes enabling a leveling system where the points tracked by the progress bar satisfy a threshold condition, such as exceeding a certain milestone or accumulating a specified number of progress points. Additionally, the method includes distributing the rewards to corresponding player accounts of the players based on predefined criteria.

Aspects of this disclosure include a method of virtual wagering, the method comprising: receiving, at a host server, a request from a player account to access a gaming platform, wherein the player account comprises player identifying information, a player wallet, and a loyalty program; determining, at the host server, whether the player account meets criteria to access the gaming platform; responsive to the player account meeting the criteria to access the gaming platform, displaying, on the graphical user interface of the player's device, a plurality of games accessible via the gaming platform; receiving, at the host server, a request to access a game; initiating, at the host server, the game, wherein initiating the game comprises displaying the game and a universal progress bar on a graphical user interface on a player's device, wherein the universal progress bar is associated with the loyalty program; receiving, at the host server, a wager associated with a currency in a player wallet; determining an outcome of the game; based at least in part on the outcome of the game, determining a loyalty score and responsive to the outcome being a win, the player account is awarded a prize; and associating, at the host server, the prize with the player wallet and the loyalty score with the loyalty program, wherein the loyalty score increases the universal progress bar.

Aspects of this disclosure relate to a method for virtual wagering wherein determining, at the host server, whether the player account meets criteria to access the gaming platform comprises the steps of: receiving, at the host server, a geo-location of a player server associated with the player's device; receiving, at the host server, a player's age; and determining, at the host server, whether the player's age and geolocation of the player server meet a pre-determined criteria of the gaming platform.

Aspects of this disclosure relate to a method for virtual wagering wherein the pre-determined criteria include local rules and regulations for gaming.

Aspects of this disclosure relate to a method for virtual wagering wherein the pre-determined criteria vary for games hosted on the gaming platform and the pre-determined criteria comprises a plurality of criteria, where various criteria permit access to portions of the gaming platform.

Aspects of this disclosure relate to a method for virtual wagering wherein the host server is a transitory server that connects the player server with a third-party gaming server.

Aspects of this disclosure relate to a method for virtual wagering wherein the gaming platform is hosted on the third-party gaming server.

Aspects of this disclosure relate to a method for virtual wagering wherein the loyalty score is determined by the third-party gaming server, and wherein the loyalty score is received by the host server.

Aspects of this disclosure relate to a method for virtual wagering wherein the prize is at least partially dependent on the player's loyalty score.

Aspects of this disclosure relate to a method for virtual wagering wherein the prize is hard currency.

Aspects of this disclosure relate to a method for virtual wagering wherein soft currency is associated, by the host server, with the player wallet regardless of the outcome of the game.

Aspects of this disclosure relate to a method for virtual wagering wherein the prize is at least partially dependent on the wager.

Aspects of this disclosure relate to a method for virtual wagering comprising: receiving, at the host server, a request to access a digital marketplace; displaying, on the player's graphical user interface, the digital marketplace comprising a plurality of in-game rewards; responsive to receiving a selection of one or more of the plurality of in-game rewards in the digital marketplace, validating the currency in the player's wallet; responsive to the player's wallet having sufficient currency for the selection of the one or more of the plurality of in-game rewards, removing an amount of in-game currency from the player's wallet equal to a cost of the selected one or more the plurality of in-game rewards and depositing the one or more of the plurality of in-game rewards into the player's wallet.

Aspects of this disclosure relate to a gaming platform comprising: a plurality of games hosted on a host server; a player account, wherein the player account comprises a player wallet comprising hard currency and soft currency: the hard currency corresponding to real-world currency, and the soft currency corresponding to soft currency specific to the gaming platform; a digital marketplace; and a loyalty program.

Aspects of this disclosure relate to a gaming platform wherein the digital marketplace comprises a soft currency shop which permits the soft currency to be exchanged for an in-game reward.

Aspects of this disclosure relate to a gaming platform wherein the loyalty program tracks the player's progress across any of the plurality of games hosted on the host server.

Aspects of this disclosure relate to a gaming platform, wherein a universal progress bar is displayed on a graphical user interface of the player's device and the universal progress bar displays the player's progress across any of the plurality of games hosted on the host server.

Aspects of this disclosure relate to a gaming platform, wherein the hard currency is transferred between the player's wallet and a third-party wallet upon receiving a request at the host server.

Aspects of this disclosure relate to a gaming platform, wherein the player account is hosted on a player server and backed up on the host server.

Aspects of this disclosure relate to a method for tracking universal progress across multiple games on a gaming platform, the method comprising: providing, at a host server, a plurality of games accessible via the gaming platform; initiating, at the host server, a first game of the plurality of games, wherein initiating the first game comprises displaying the first game and a universal progress bar on a graphical user interface of a player's device; receiving, at the host server, data indicating progress made by a player account in the first game; updating the universal progress bar based on the progress made in the first game; initiating, at the host server, a second game of the plurality of games different from the first game, wherein initiating the second game comprises displaying the second game and the updated universal progress bar on the graphical user interface of the player's device; receiving, at the host server, data indicating progress made by the player account in the second game; and updating the universal progress bar based on the progress made in the second game, wherein the universal progress bar reflects cumulative progress across the first game and the second game.

Aspects of this disclosure relate to the method further comprising displaying the updated universal progress bar on the graphical user interface during gameplay of any of the plurality of games on the gaming platform.

Aspects of this disclosure relate to the method wherein at least a first portion of the plurality of games is hosted on the host server.

Aspects of this disclosure relate to the method where at least a second portion of the plurality of games is hosted on a third-party server.

Aspects of this disclosure relate to the method wherein providing access via the gaming platform comprises providing access to the second portion of the plurality of games hosted on the third-party server.

Aspects of this disclosure relate to the method wherein the data indicating progress comprises any of level completion data, earned points data, activity data, and unlocked achievement data.

Aspects of this disclosure relate to the method wherein the cumulative progress may be redeemed for awards.

Aspects of this disclosure relate to a method for tracking cumulative universal progress and providing rewards in a gaming platform comprising a plurality of games, the method comprising: receiving, at a host server, one or more signals from each of the plurality of games played by a player, each of the one or more signals indicating progress generated by gameplay actions, the progress measured by a native point system; converting, at the host server, the native point system into universal point system values; aggregating, at the host server, the universal point system values from the plurality of games to generate a universal progress metric that represents a cumulative progress of the player across all games; dynamically updating, at the host server, a universal progress bar to reflect the universal progress metric in real time; determining, at the host server, that the universal progress metric has reached a predetermined threshold corresponding to a reward level; and responsive to the universal progress metric meeting the predetermined threshold, awarding a reward to the player by crediting a reward value to a player wallet associated with the player's account.

Aspects of this disclosure relate to the method wherein the conversion from the native point system to the universal point system values is based on game-specific weighting.

Aspects of this disclosure relate to the method wherein the universal progress bar is displayed on a graphical user interface of a player's device.

Aspects of this disclosure relate to the method further comprising displaying the universal progress bar on the graphical user interface during gameplay of any of the plurality of games on the gaming platform.

Aspects of this disclosure relate to the method further comprising displaying, on the graphical user interface, an indication of the updated universal progress metric and the awarded reward, wherein the awarded reward is redeemable for in-game bonuses, digital goods, or cross-game benefits.

Aspects of this disclosure relate to the method wherein the one or more signals may be generated from any of level completion data, earned points data, activity data, and unlocked achievement data.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

FIG. 4 illustrates a schematic representation of a table showing a mapping of the rewards corresponding to each player as per meta-gaming mechanics of the gaming platform, in accordance with an example implementation.

FIG. 5 illustrates a schematic representation of level configurations as per the meta-gaming mechanics of the gaming platform, in accordance with an example implementation.

FIGS. 7A-7B illustrate schematic representations of features and limitations on different levels/tiers for the players as per the meta-gaming mechanics, in accordance with an example implementation.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized, and that structural changes and/or substitutions of various elements may be made without departing from the scope and spirit of this disclosure. The following detailed description is, therefore, not to be construed in a limited sense.

In existing gaming platforms, progress tracking and reward mechanisms are often fragmented and specific to individual games. Each game maintains its own progress bar for tracking progress of a player, such as player achievements or points obtained according to game mechanics of the game being played. However, the progress of the player is not tracked/consolidated across multiple games provided on the gaming platform. This approach limits the ability of the player to view their overall progress in multiple games within a single User Interface (UI). Further, rewards are typically game-specific, and players are unable to accumulate points or achievements from one game and redeem them for rewards provided in other games. Such lack of integration and universality in progress tracking and reward mechanisms reduces player engagement and the perceived value of rewards, as players cannot leverage their achievements across different games provided on the gaming platform. Further, having a universal progress tracker that provides real-time feedback may provide additional incentive, reinforcement, and/or motivation for players to continue playing.

The present disclosure solves at least the aforementioned problems, by providing a universal progress bar that appears at the top of each game screen/UI within the gaming platform and across multiple servers. The progress bar tracks the cumulative progress of the player across all games provided in the gaming platform, according to the game mechanics of each game. Additionally, embodiments of the present disclosure allow players to redeem and/or exchange the points and/or units accumulated and/or indicated in the universal progress bar for different rewards, such as in-game bonuses in any game of the gaming platform, real-world prizes, and the like, but not limited thereto. The integrated reward mechanism may not only enhance player motivation and engagement but may also significantly increase the value and appeal of the rewards, as the players may benefit from their progress across multiple games within the same gaming platform. Various embodiments of the present disclosure will be explained in detail with respect to FIGS. 1-13.

Figure 1:
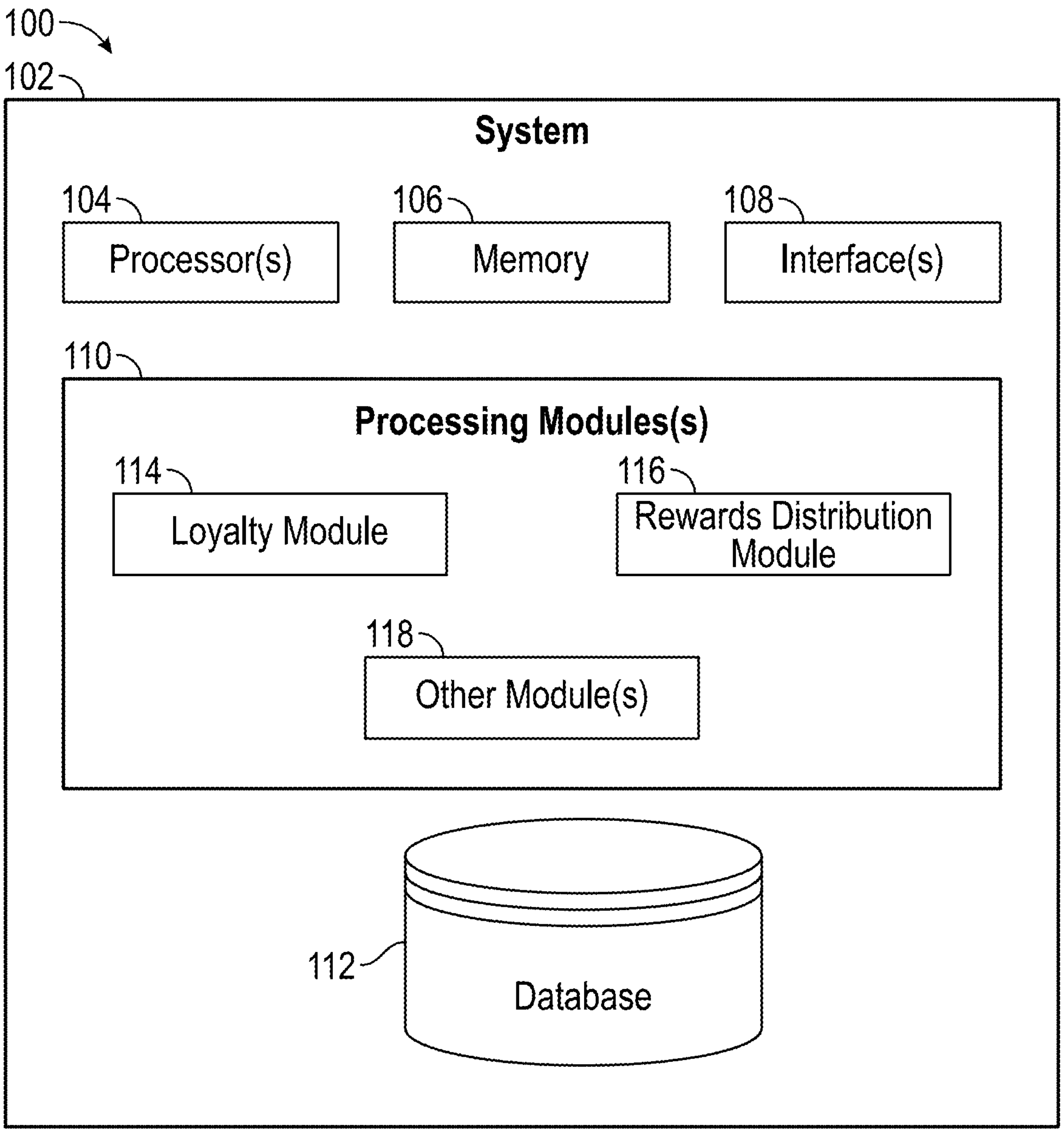
FIG. 1 illustrates a block diagram of a system for tracking universal progress of a player across a plurality of games provided on a gaming platform, in accordance with an example implementation.

FIG. 1 illustrates a block diagram 100 of a system 102 for tracking universal progress of a player across a plurality of games in a gaming platform, in accordance with an example implementation.

Referring to FIG. 1, the system 102 may include a processor(s) 104, a memory 106, and an interface(s) 108. The processors 104 may be implemented as one or more microprocessors, microcomputers, microcontrollers, digital signal processors, central processing units, logic circuitries, variational circuits, quantum processors, mechanical/analog processors, and/or any devices that manipulate data based on operational instructions. Among other capabilities, the processor(s) 104 may be configured to fetch and execute computer-readable instructions stored in the memory 106 of the system 102. The memory 106 may store one or more computer-readable instructions or routines, which may be fetched and executed by the processors 104 for the functioning of the system 102. The memory 106 may include any non-transitory storage device including, for example, volatile memory such as Random-Access Memory (RAM), or non-volatile memory such as Erasable Programmable Read-Only Memory (EPROM), flash memory, and the like.

The interface(s) 108 may include a variety of interfaces, for example, interfaces for data input and output devices, referred to as I/O devices, storage devices, and the like. The interface(s) 108 may facilitate communication of the system 102 with various devices coupled to it. The interface(s) 108 may also provide a communication pathway for one or more components of the system 102. Examples of such components include, but are not limited to, processing module(s) 110, and a database 112. The database 112 may include data that is either stored or generated as a result of functionalities implemented by any of the components of the processing module(s) 110.

In an embodiment, the processing module(s) 110 may be implemented as a combination of hardware and software/programming (for example, programmable instructions) to implement one or more functionalities of the processing module(s) 110. In embodiments described herein, such combinations of hardware and programming may be implemented in several different ways. For example, the software/programming for the processing module(s) 110 may be processor executable instructions stored on a non-transitory machine-readable storage medium and the hardware for the processor(s) 104 may include a processing resource (for example, one or more processors), to execute such instructions. In one embodiment, the machine-readable storage medium may store instructions that, when executed by the processing resource, implement the processing module(s) 110. In some embodiments, the system 102 may include the machine-readable storage medium storing the instructions and the processing resource to execute the instructions, or the machine-readable storage medium may be separate but accessible to the system 102 and the processing resource. In an embodiment, the processing module(s) 110 may be implemented by an electronic circuitry. The processing module(s) 110 may include a Loyalty module 114, a rewards distribution module 116, and other module(s) 118. The other module(s) 118 may implement functionalities that supplement applications/functions performed by the processing module(s) 110.

In some embodiments, the system 102 may be configured to provide a gaming platform for one or more users. The gaming platform may host a plurality of games, each having the same or different game mechanics. The game mechanics correspond to rules, elements, and/or processes of the corresponding game. The game mechanics may also include a set of instructions (implemented as processor-executable instructions), that grant points, scores, units, or any other metric to indicate progress made by the user towards a game objective. For example, a game indicative of a virtual slot machine may have the game objective to obtain a predetermined pattern of graphical elements on the UI of a player's device, which allow player users to increase or maximize a 'wealth score'. The game mechanics of the virtual slot machine may include instructions that randomly display a set of graphics on the UI and increase the player's wealth score when the UI displays a subset of the graphics in a predetermined pattern. However, a game mechanic's randomness may be a function of the underlying intent of the game, wherein one or more games may not provide an output according to a random function. The gaming platform may also provide a UI to allow the players to select and play any of the games accessible via the gaming platform.

In some embodiments, each of the games provided on the gaming platform may be developed by any or a combination of the operators of the gaming platform, or third-party entities. In some embodiments, when the games are developed by the operators, the games may be natively hosted on the gaming platform at the host server. In other embodiments, when the games are developed by third-party entities, such games may be embedded in the gaming platform and hosted on a third-party gaming server. In such embodiments, the embedded games may be downloaded from the third-party gaming server and made playable on a local container of the gaming platform. Further, the embedded games may also be configured to transmit and receive signals from external entities/servers, such as servers maintained by the operators of the gaming platform, servers maintained by player's devices, or servers maintained by third party entities. For example, multi-player games, such as online chess, may require signals containing data associated with moves played by the players to be exchanged between multiple servers/user devices (e.g., directly or indirectly via server(s) bridged communication).

In some embodiments, the gaming platform may be implemented in a payment-freed apparatus. For example, the gaming platform may include a gaming console with one or more hardware interfaces (such as levers, knobs, buttons, sliders, keys, pedals, gears, and the like), using which the players may select and play/engage with the game. Such gaming consoles may be freed on making payments thereto, either in the form of fiat currency, digital currency, digital assets, coins, tokens, tickets, soft currency, play cards, and the like.

In other embodiments, the payment-freed apparatus may correspond to a variety of electronic devices, including mobile phones, tablets, laptops, desktop computers, or any other electronic devices capable of running software applications. In such embodiments, the gaming platform may be implemented as a software application installed on the player's device. The gaming platform may be configured to communicate with the system 102 using a communication network. Communication network may be a wired or a wireless communication network.

Examples of wired communication networks include electric wires, cables, optical fiber cables, telephone lines, and the like. Examples of wireless communication networks include telecommunication networks, Bluetooth®, near-field communication, Wireless-Fidelity (Wi-Fi), and the like. When installed on the player's device, the gaming platform may enable players to engage with any of the games provided thereover. The gaming platform may be freed/made accessible on making electronic payments thereto.

In some embodiments, the payment-freed apparatus/player's device may be configured to communicate with the host server (e.g., the system 102) to facilitate various functions of the games. This system 102 may act as the backbone of the gaming platform, maintaining and managing all the data required for the operation of the games. The system 102 may store a plurality of profiles corresponding to each user in a dedicated database (e.g., database 112). The plurality of profiles may comprise a variety of different roles, each of which provides a different level of access and experience with the system. For example, the plurality of profiles may comprise player profiles, back-office profiles, and/or third-party profiles. The plurality of profiles may define the user's role within and access to the system. For example, the player profiles may access the front-end of the system, which provides the player with the ability to interact with the plurality of games, a digital marketplace, a wallet, and other interfaces. Each player profile may include detailed information about gaming history, a universal progress metric/value, rewards, achievements, scoreboard, rankings, and other relevant data of the player.

The back-office profiles may correspond with administrators or other individuals who monitor the system and ensure compliance. The back-office profiles may be maintained on the host server and may have access to the back office of the system. The level of access may, in some embodiments, be determined by a characteristic associated with the back-office profile. For example, some back-office profiles may have access to code and/or other interfaces to alter the operating of the system. In an embodiment, at least one of the back-office profiles may have access to a wallet.

The third-party profiles may have access to the back end of the games and a wallet. In an embodiment, any of the third-party profiles may have access to a corresponding game, such as the game provided by the third-party. The wallet associated with each of the plurality of profiles may comprise specific characteristics that are discussed in more detail herein.

In some embodiments, when the player plays the game on the player's device/apparatus, the gaming platform may send and/or receive data from the system 102 in real-time. For instance, when the player completes a level, earns points, or unlocks an achievement, such information may be sent to the host server, which updates the profile of the player accordingly. The host server then sends updated data back to the player's server maintained on the player's device, ensuring that the player's progress and rewards are accurately reflected within the gaming platform. Additionally, the system 102 may handle user authentication and security, ensuring that the data of each user is protected and only accessible to the corresponding user. In an embodiment, when the player interacts with the gaming platform via the player's devices, the UI of the gaming platform provides an intuitive and engaging experience. In an embodiment, the system 102 may be configured to handle a large number of the users simultaneously. To enhance player engagement, the gaming platform may employ various visual feedback mechanisms, including animations, color changes, and incremental progress markers.

In some embodiments, the processing module(s) 110 may include a Loyalty module 114 configured to track a cumulative progress of the player across all games provided in the gaming platform. As the player plays different games and completes various actions, data may be transmitted to the server/system 102, which processes the data in real-time and updates the profile/universal progress bar of the player.

In some embodiments, the gaming platform/system 102, using the Loyalty module 114, may be configured to track and monitor the game mechanics of each game, to track the universal progress of the player. In some embodiments, the gaming platform may have access to the source code of the games, which may be analyzed to allow the gaming platform to concomitantly update the universal progress bar along with the fragment/game-specific progress bar, when the player makes progress. As a nonlimiting example, source code for a given game may be made available to the gaming platform and/or the administrator of the gaming platform, wherein the components associated with points, rewards, progress, and the like in the native game environment are routed to the universal tracking and reward mechanism of the gaming platform. In other embodiments, the games hosted on the gaming platform may be required to transmit signals and notify the gaming platform of the progress made by the player. As a nonlimiting example, the points, rewards, progress, and the like in the native game environment may be transmitted to the gaming platform, wherein the gaming platform updates the universal tracking and reward mechanism of the gaming platform. In such a nonlimiting example, the gaming platform may include a conversion table or a script configured to convert the native point system to the universal point system of the gaming platform. The signals may be transmitted in the form of any or a combination of Application Programming Interface (API) calls, web hooks, methods/functions, command line interface (CLI) commands, and the like, but not limited thereto. Upon receiving the signals, the gaming platform may be configured to update the universal progress bar and display the same on the UI. In further embodiments, the system 102 may be configured to use an artificial intelligence (AI) engine to recognize the progress made in each of the games.

In an embodiment, the UI may display the universal progress bar, which provides a visual representation of the progress made by the player according to the game mechanics. The universal progress bar may maintain any score, value, and/or points corresponding to the progress made in each game. For example, a first game may award the player a first value of 'points,' and a second game may award the player with a second value of 'points' based on the progress made in the corresponding games. The first value and the second value may be aggregated and converted into the universal progress bar to represent the 'universal progress' made by the player. In some embodiments, as the difficulty of each of the games may be different, different multiples of the score, value, and/or points metric representing progress in each of the games may be aggregated into the progress bar. For example, if a first game is twice as hard as a second game, the first value from the first game may be doubled, and the second value from the second game may be aggregated to the doubled first value. The gaming platform may include other rules/mechanisms to improve player engagement, such as increasing multipliers of scores earned in a particular game if the player is consistently playing that particular game.

The universal progress, hence, represents a value and/or numeric representation of the progress made by the player in all games provided via the gaming platform. While the embodiments of the present disclosure are described in the context of representing the universal progress using the universal progress bar, it may be appreciated by those skilled in the art that the universal progress may be provided with any other static or dynamic representation in the UI associated with the gaming platform.

In some embodiments, the rewards distribution module 116 may manage the accumulation and distribution of rewards based on the universal progress (metric). Whenever the players make progress in the games, such as by reaching specific milestones, performing certain predefined actions, or receiving success in a game of chance, the rewards distribution module 116 may determine a corresponding reward for the player. The rewards may be redeemed through either an in-game shop/e-commerce interface or an e-commerce interface managed by the operators of the gaming platform. The progress represented by any of the points, values, and scores on the progress bar may be redeemed with including, but not limited to, in-game bonuses, digital gift cards, off-game/meta-game bonuses/prizes/rewards real-world prizes. In an embodiment, the rewards distribution module 116 may accurately track and distribute the rewards based on predefined criteria. In an embodiment, the predefined criteria may represent the distribution of the rewards within the gaming platform to ensure that players are incentivized and engaged through various achievements and activities. The players earn different rewards upon reaching specific game milestones, such as completing a certain number of levels or achieving high scores in different games, or different modes thereof. In some embodiments, the universal progress may be used to redeem the rewards in any of the games, instead of allowing players to only redeem in-game rewards using progress points/metrics associated with the corresponding game. The points, value, and/or score represented by the universal progress metric/bar may be used as soft currency to make transactions in any of the games.

The system 102/gaming platform may enable the universal progress metrics to be redeemed for rewards, by transmitting corresponding signals to the games from which the player seeks rewards. In such embodiments, the signals may be transmitted as API calls, method/function calls, webhooks, CLI commands, and the like, but not limited thereto. Such signals may be associated with the game mechanics, which may be adapted to allow universal progress metrics to be used for redeeming the rewards. For example, when the game requires "in-gaming credits" to be used to purchase an in-game item, the gaming platform may be configured to convert the universal progress metrics to the "in-gaming credits" (such as by transmitting signals or adapting the game mechanics of the different games), to allow such "in-gaming credits" to be used and redeemed for the rewards within the game.

In an embodiment, the player server maintained on the player's device may track any of the universal progress metrics. In a further embodiment, the player's device/server may transmit the universal progress metrics to the host server to be stored as a backup. In another embodiment, the host server may track any of the universal progress metrics. In such an embodiment, the host server may transmit the universal progress metrics to the player's device/server. In still another embodiment, a third-party server may track any of the universal progress metrics and transmit the metrics to the host server and/or the player's device/server.

In an embodiment, the allocation of rewards may be managed by automated algorithms, ensuring that rewards are distributed fairly and consistently according to predefined criteria, while also preventing malicious actors from exploiting vulnerabilities in the games/gaming platform. Such automation streamlines the reward distribution process, making it efficient and reliable. Players can be assured that their efforts will be recognized and rewarded appropriately. In some examples, certain rewards may be allocated to the players when the universal progress metric exceeds a predetermined threshold, such as, for example, providing the players with a "spin on a wheel" while the universal progress metric exceeds 100,000 units in a day.

In an embodiment, a notification technique may be implemented in the system 102 to inform the player about their rewards, as they make progress through the games. The player may receive in-application notifications, emails, or push notifications on the player's device when they earn rewards. The system 102 may thereby ensure that the players are promptly made aware of their achievements and the rewards made available to them. The notification may originate from the host server that transmits the notification to the server on the player's device. Alternatively, the notification may originate on a third-party server that may transmit the notification to the host server and the server on the player's device. In another alternative, the notification may originate on a third-party server that may transmit the notification to the host server which in turn may transmit the notification to the server on the player's device. To maintain the integrity of the reward mechanism, security measures such as user authentication, data encryption, and fraud detection algorithms can be implemented. The security measures may protect the users against unauthorized access and fraudulent activity, ensuring that rewards are earned and redeemed legitimately.

The combination of a universal progress bar and a robust reward mechanism is contemplated to significantly enhance the player's experience. Continuous feedback on progress and meaningful rewards for achievements may keep the players engaged and motivated. The system 102 may not only improve player retention but can also foster a sense of accomplishment and satisfaction in the players. The proposed progress bar and reward mechanism may provide a comprehensive, engaging, and player-centric gaming experience.

In an embodiment, at least one of the games may allow the players to wager or place bets. For example, the games may include virtual gambling houses, virtual slot machines, card games, and other games, where the players may place bets on the occurrence of certain events. The rewards distribution module 116 may be configured to allocate rewards to the player when the player wins the bet. In some embodiments, the reward may be a multiple of the value of money wagered in the game. In an embodiment, the gaming platform may allow the players to choose their bet value, enabling them to place bets according to their preferences. The rewards may be redeemable by the universal progress metrics that may be accumulated and tracked through the universal progress bar, reflecting the overall engagement of the player across all games. This system 102 may allow players to actively participate by offering them the flexibility to bet at their desired level while earning points that can be exchanged for in-game bonuses or real-world prizes, thereby enhancing the overall gaming experience.

Such wagers or bets placed by players may originate in the player server maintained by the player's device. The player server may transmit the wager or bet to the host server and/or third-party server. In the event a wager or bet placed by the player is either won or lost, the result and accompanying reward may be sent to the player's device/server by either the host server or the third-party server.

Examples of the games on the gaming platform are shown in FIGS. 2A-2H, which illustrate schematic representations 200A-200H of different user interfaces of the gaming platform, in accordance with one embodiment. For example, the gaming platform may be a virtual casino and may comprise a plurality of virtual slot machines.

Figure 2A:
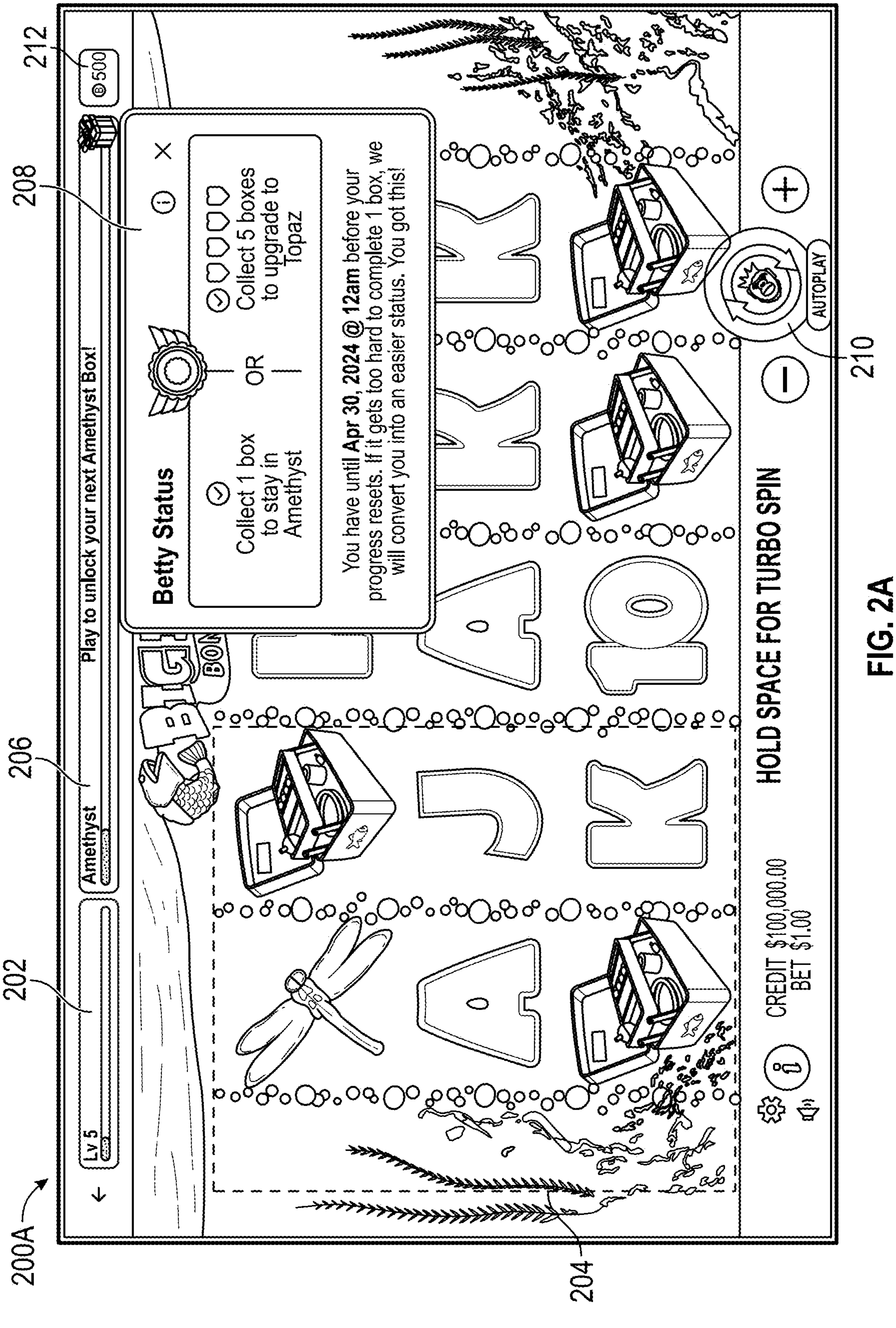
FIGS. 2A-2H illustrate schematic representations of User Interfaces (UI) in the gaming platforms, in accordance with an example implementation.

FIG. 2A illustrates a game corresponding to a virtual slot machine 200A. By clicking or pressing the trigger button 210, the player may cause the game mechanics to generate a random pattern of interactive elements 204, such as spinning wheels, symbols (e.g., dragonfly, toolbox, letters, numbers), and display the pattern on the UI. The UI may also display a current level of the player (Level 5) 202, a status of the player within the game, and a progress bar 206 indicating a current progress of the player towards unlocking rewards. Additionally, the UI may provide real-time updates on the reward status of the player through a pop-up window represented as a level/tier status 208. The level/tier status 208 window may inform the player of the requirements to maintain or upgrade their level/tier. The level/tiers may be used by the game mechanics to increase the difficulty of the corresponding game. Further, the rewards allocated to the players may be directly proportional to the difficulty of the game. In an embodiment, the UI may include various other interactive elements such as a "hold space for turbo spin" button, which allows the player to play the game by holding the button.

Figure 2B:
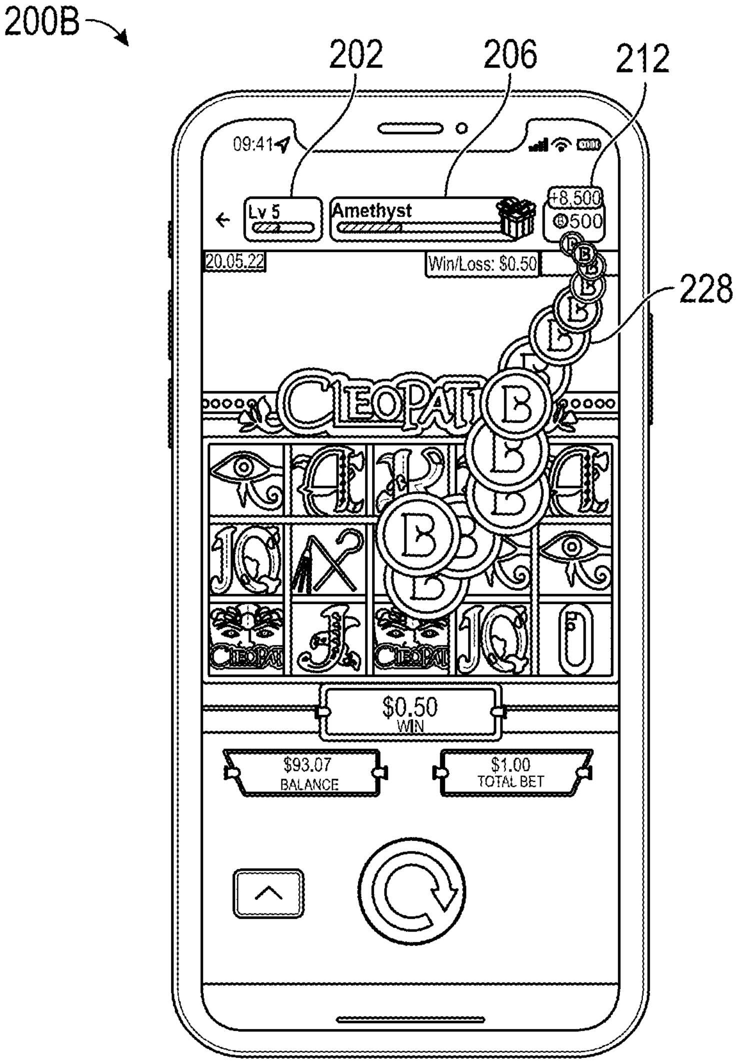
Figure 2C:
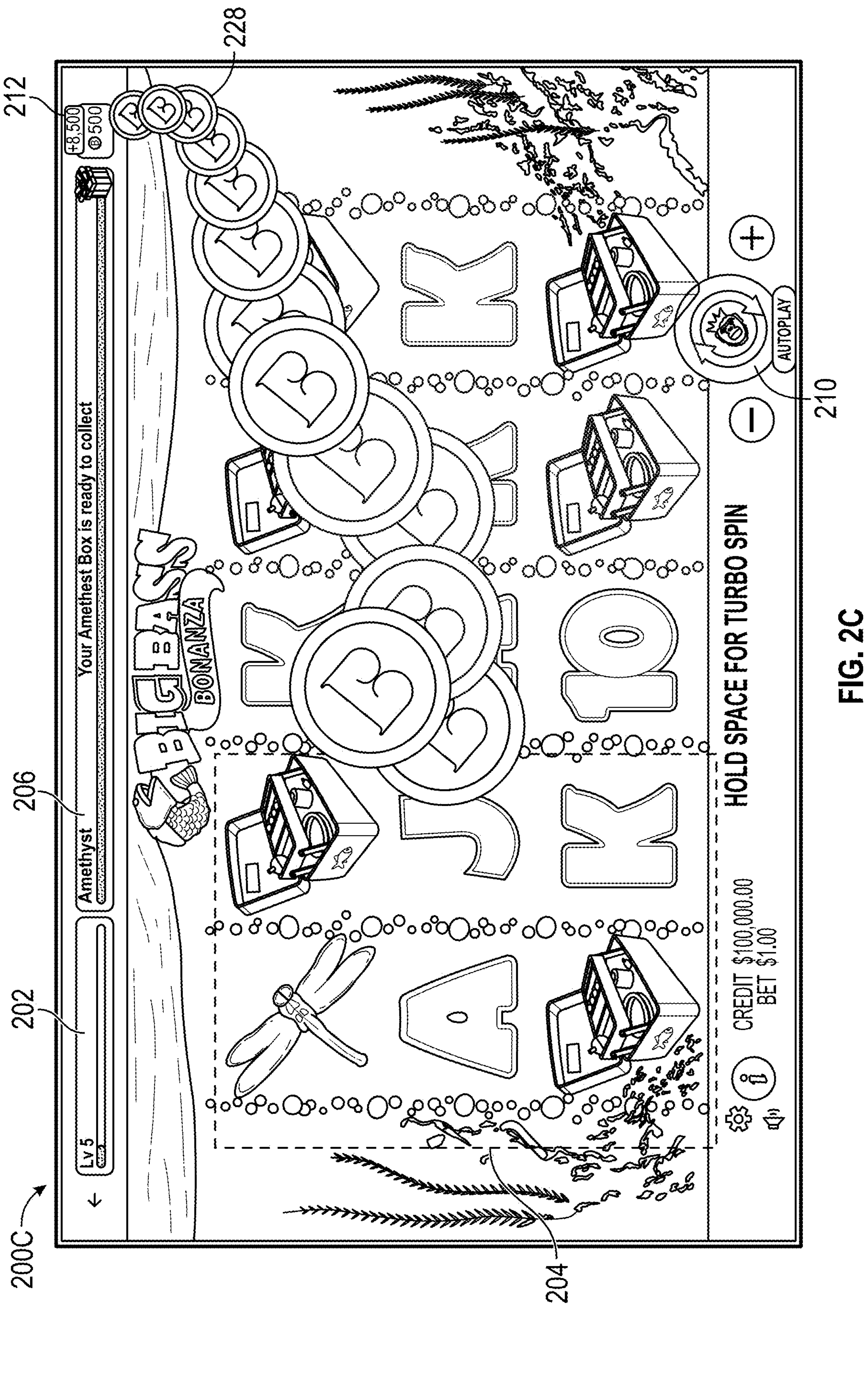
Figure 2E:
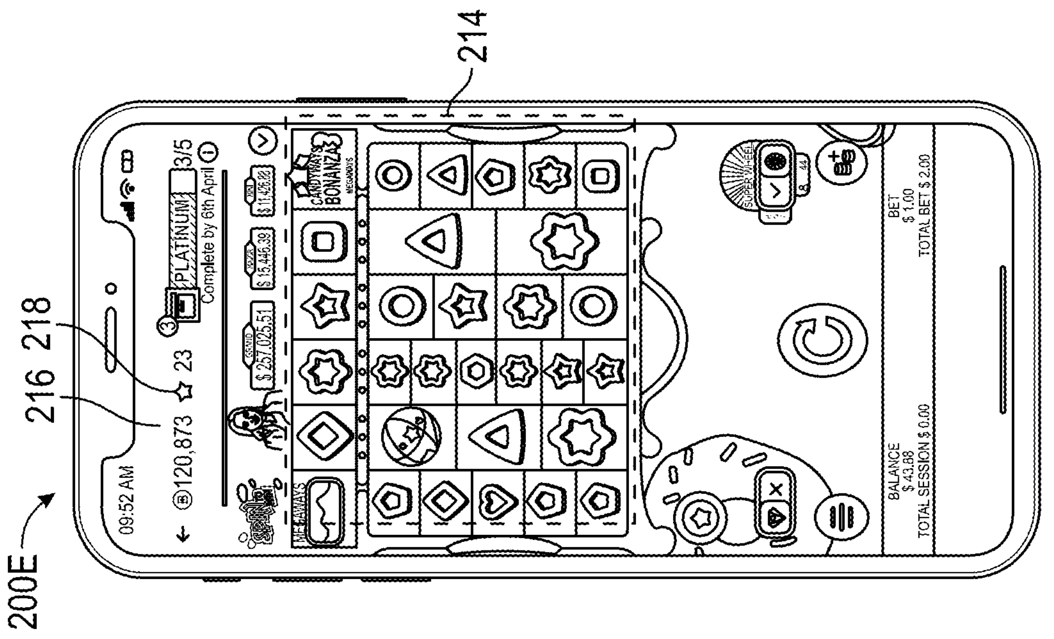
Figure 2D:
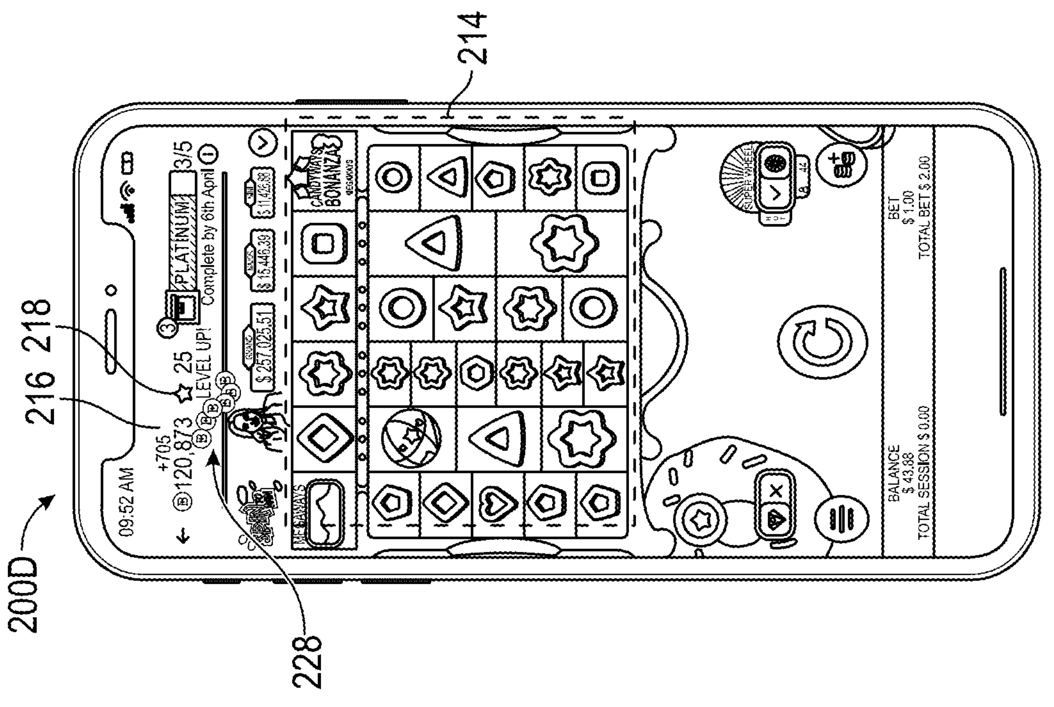
Figure 2F:
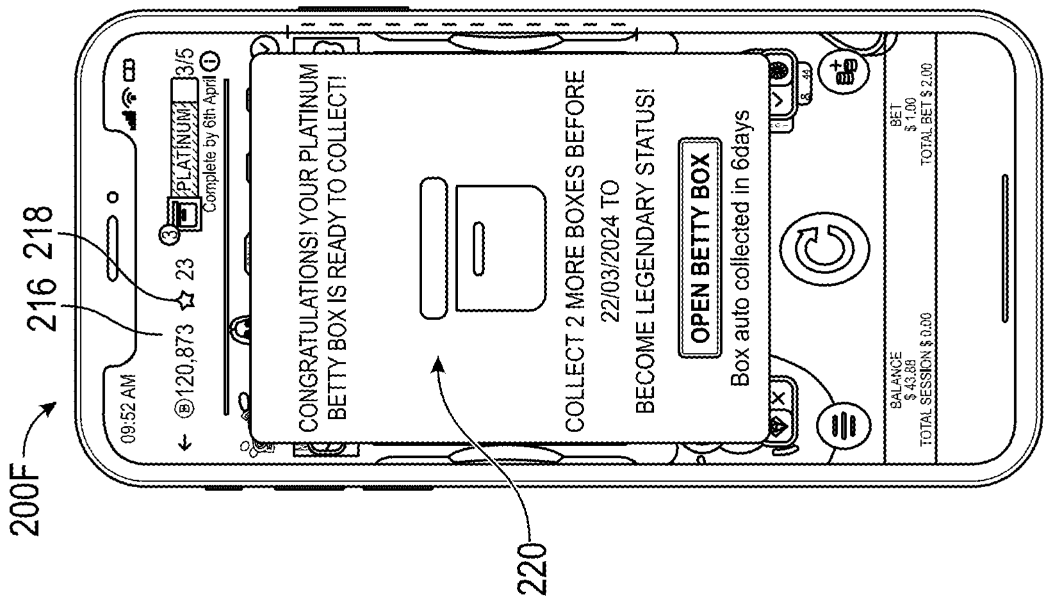
Figure 2G:
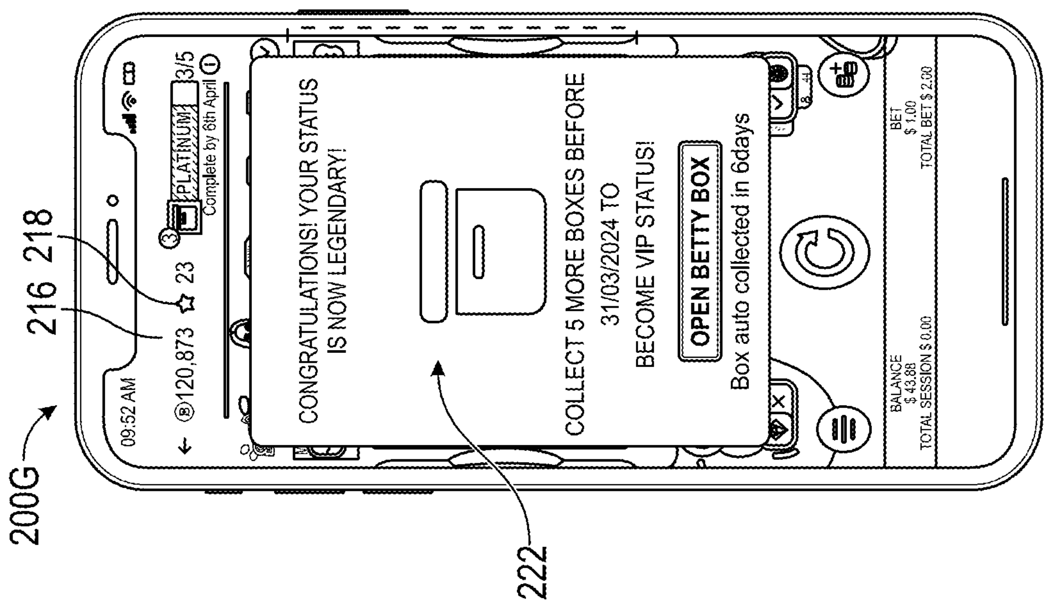
Figure 2H:
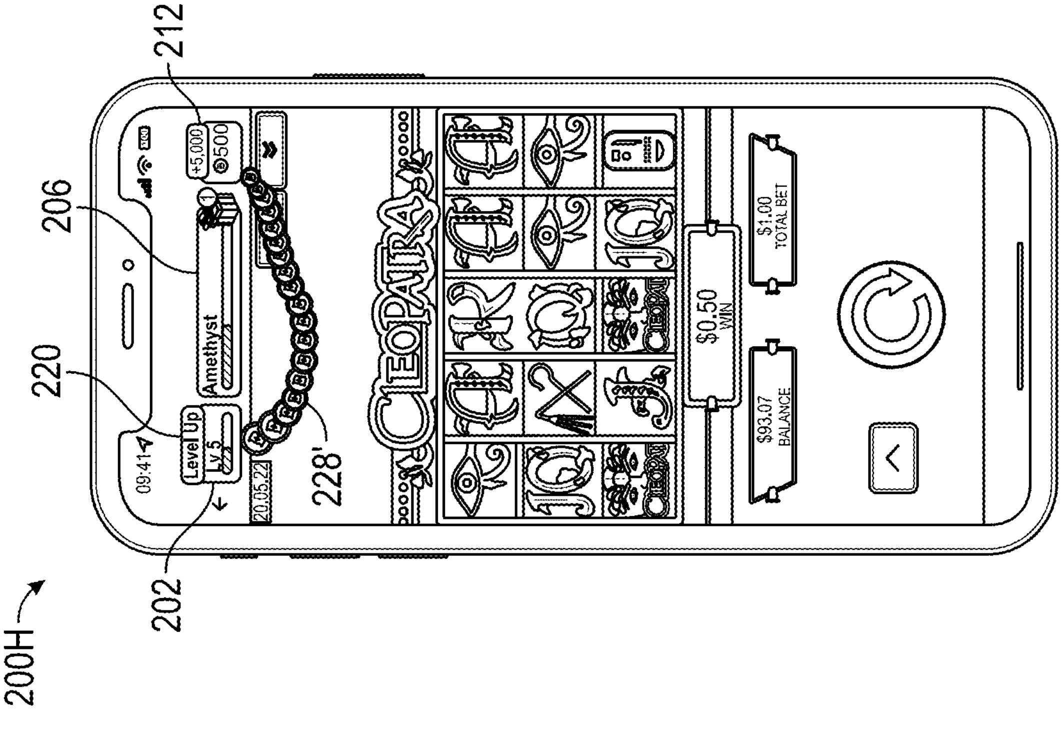

FIGS. 2B, 2C, and 2H illustrate animations associated with progress made and rewards allocated to the use in different games. For example, FIG. 2B illustrates an embodiment of a UI 200B displaying an animation when the player has achieved a win, indicated by the +8,500 rewards/soft currency animation 228. Similarly, FIG. 2C illustrates another UI 200C displaying the rewards/soft currency animation 228 that occurs when the player achieves a win. The animation 228 includes a plurality of coins/soft currency 212 with "B" symbols dropping across the screen, reinforcing the rewarding experience and encouraging continued gameplay. Further, FIG. 2H illustrates one more embodiment of a UI 200H displaying a different rewards/soft currency animation 228' that occurs when a player's level increases as tracked by the universal progress bar 202, indicated by the +5,000 rewards/soft currency animation 228'. The animation 228' includes a "level up" message 220 and a plurality of coins/soft currency 212 with "B" symbols flowing across the screen, reinforcing the rewarding experience and encouraging continued gameplay. In other embodiments, the player may receive other various rewards for leveling up including, but not limited to, hard currency, sweepstake entries, free spins, prize boxes, or any other item or game mechanic with some value. The soft currency (indicated by the "B" symbols) 212 may be accumulated and utilized in the ecommerce interfaces associated with the gaming platform for purchasing in-game items, power-ups, real-world objects, and other bonuses. The animation 228 is contemplated to be dynamic and visually appealing, enhancing player engagement. At the top of the screen, the current level (Level 5) 202 and status are also displayed, along with the progress bar 206 illustrating the advancement of the player toward the next soft currency milestone. The constant visibility of progress bar may help players stay motivated to continue playing the games. The balance of soft currency is shown at the top right, ensuring players are always aware of their current point balance. The autoplay button and adjustable bet options (+/−) provide the players with additional control over their gameplay experience, allowing for customization based on individual preferences. These elements may be designed to maintain player engagement and enhance the overall gaming experience.

In an embodiment, the players may utilize their soft currency 212 in the e-commerce interface in a variety of ways. Soft currency, in respect to the present disclosure, may be understood to be a unit of platform currency that may have no value outside of the disclosed digital platform. This soft currency may be a type of digital token or digital coin used to make purchases throughout the platform. The soft currency 212 may be a secondary, soft currency that can be utilized to purchase items in a digital marketplace. The digital marketplace may be a virtual shop where players can exchange their soft currency 212 for a variety of digital goods and/or rewards. For example, the players may exchange their soft currency 212 for any cryptocurrency, such as Bitcoin, that can be stored, traded, or spent in various online and offline marketplaces outside the gaming platform. The soft currency 212 may also be exchanged for utility tokens, which may be used for availing a utility (such as membership, subscription, ticket, and the like) corresponding to the utility token. In another example, the soft currency 212 may be encashed/converted into fiat currency. In further examples, the players may use their soft currency 212 to make purchases on other online shopping platforms, by redeeming them as gift cards, or discount vouchers applicable on products, such as electronics, clothing, groceries, home goods, and the like. In still further examples, the soft currency 212 may be converted into various types of coupons, such as dining discounts, or tickets to entertainment events such as movies, concerts, or theme parks. In an embodiment, the player may convert their soft currency 212 into travel vouchers for booking flights, hotels, car rentals, or complete vacation packages, offering a tangible and enjoyable benefit. In an embodiment, digital gift cards from major retailers, both online stores and physical stores, are another option, giving players flexibility to spend their soft currency 212.

In an embodiment, within the gaming platform, the soft currency 212 may be directly used to purchase in-game items, including special power-ups, exclusive characters/skins/avatars, additional levels, or other game-enhancing features. For example, the soft currency 212 may be utilized to purchase additional spins and/or power-ups that can be used with the games on the gaming platform. The players may also, in some embodiments, redeem soft currency 212 for subscriptions to popular streaming services, music platforms, or digital magazines, allowing them to enjoy premium content without additional cost. In one embodiment, the soft currency 212 may be donated to various charitable organizations. In an embodiment, the soft currency 212 may also be used to upgrade membership tiers within the gaming platform or affiliated services to grant the players with additional benefits, such as faster point accumulation, exclusive access to events, or premium customer support. In an embodiment, one or more of the currencies associated with the gaming platform may be utilized to make purchases or elicit actions within one or more of the third party games. As a nonlimiting example, in instances where the third party games include native rewards or prizes, the one or more currencies (e.g., those associated with universal progress) associated with the gaming platform may be converted to those of the native games, enabling a user to utilize universal progress to receive a native reward in a given third party game. However, such a schema may not be in included, for example, in an instance where the system administrator does not intend to allow universal progress to directly impact native rewards of a third party game.

In an embodiment, the player who wishes to donate or spend the substitute may initiate the action on the player's device. In such an embodiment, the server maintained on the player's device may transmit a signal to the host server to initiate such a transaction. In a further embodiment, the host server may complete the transaction and transmit the purchased good or service to the player's device/server and/or to a third-party server.

FIGS. 2D-2E illustrate embodiments of a leveling system on gameplay screens demonstrating point accumulation. In FIG. 2D, a game interface (e.g., UI) 200D shows various shapes and icons on a grid 214, with the progress bar on the UI (such as at the top margin thereof). The current points (120, 873) 216 of the player and star count (25) 218 are displayed prominently. The UI may display an animation indicating +705 points increase, demonstrating the point accumulation in real-time as the player interacts with the game elements. Similarly, referring to FIG. 2E, the star count (23) 218 has been reduced, indicating a-2-star count decrease from the user interface illustrated in FIG. 2D. The point and star count accumulation are dynamic, reflecting the continuous engagement of the player. FIG. 2E illustrates another embodiment of a game interface UI 200E with the same grid 214 as FIG. 2D, emphasizing the visual consistency and user-friendly interface between multiple user interfaces. As shown, progress metrics from different games may be received, aggregated, and present on the universal progress bar/metric.

In some embodiments, the universal progress bar/metric may also be used by the leveling system as a meta-game metric. For example, the progress bar may allow players to progress and unlock new levels that are associated with the gaming platform, thereby gamifying the gaming platform. In such embodiments, the universal progress bar may also be used for obtaining meta-gaming rewards or off-gaming rewards provided by the gaming platform. FIGS. 2F-2G illustrate notifications displayed on the user interface for collecting rewards associated with off-game rewards. In FIG. 2F, illustrating an embodiment of a UI 200F when a notification appears, congratulating the player on their "platinum betty box" 220 being ready to collect. The message prompts the player to collect more boxes to achieve "legendary status" and provides a clear action button ("open betty box") for the player to collect their reward. The notification also mentions that the box may be auto collected in 6 days if not manually collected. Referring to FIG. 2G, another embodiment of a gaming interface UI 200G when another notification congratulates the player on achieving "legendary status" 222 and encourages collecting more boxes to reach "VIP Status".

Figure 3C:
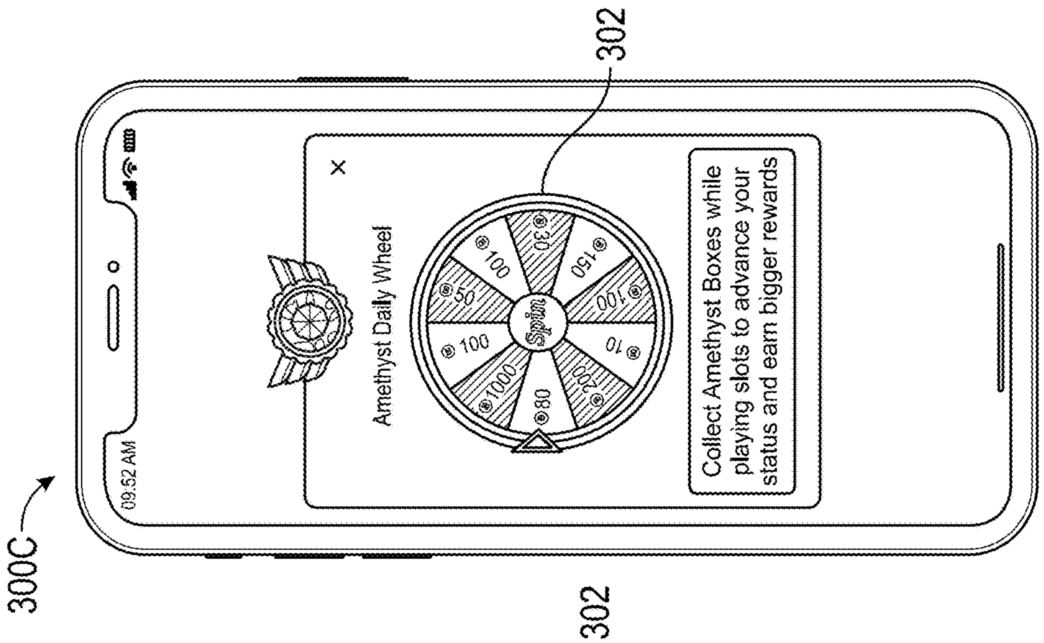
FIGS. 3A-3C illustrate schematic representations of providing meta-gaming or off-gaming rewards, in accordance with an example implementation.
Figure 3B:
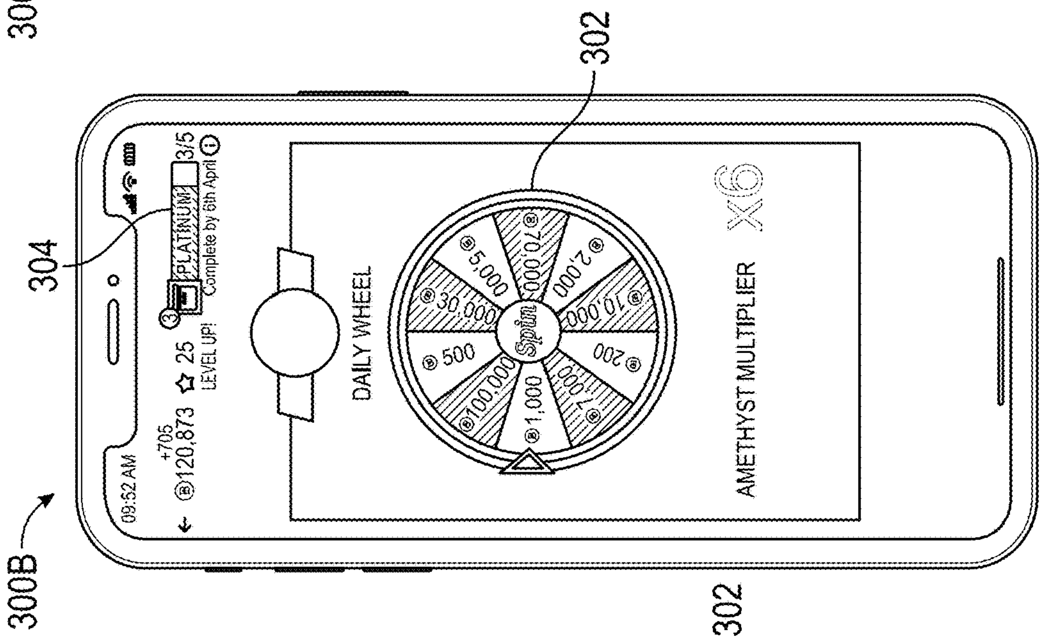
Figure 3A:
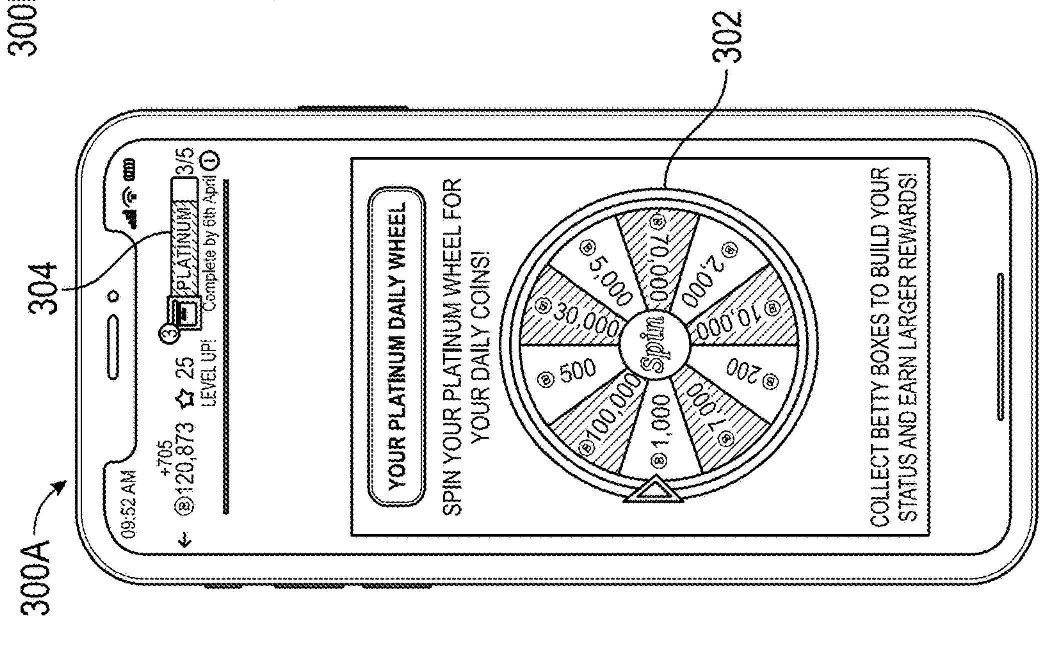

FIGS. 3A-3C illustrate a schematic representation 300A, 300B, and 300C of other meta-gaming or off-gaming rewards, in accordance with an example implementation. Referring to FIG. 3A, a mobile screen interface (e.g., a UI) where players can spin a reward wheel 302. This feature may allow the players to earn random rewards by spinning the wheel 302, adding an element of chance and excitement to the game. The interface may include a button to initiate the spin and display the reward once the wheel 302 stops. In an embodiment, the player is encouraged to spin the wheel 302. In FIG. 3A, the screen shows a spinning wheel 302 with a message prompting the player to "spin the platinum wheel for your daily coins!". A current progress of the player and level (such as "platinum") 304 are displayed at the top, along with a progress bar indicating the completion percentage (corresponding to progress in the game). The progress bar at the top may indicate the advancement of the player towards the next reward tier.

Referring to FIG. 3B, after spinning the wheel 302, the screen updates to show the reward won by the player. In this example, the wheel 302 has landed on a section indicating "×6" rewards. The current progress of the player and level 304 are again displayed at the top, maintaining visual consistency and reinforcing the status of the player. The reward ("×6") is prominently displayed, ensuring the player is immediately aware of their winnings. In some embodiments, there may be additional buttons or prompts displayed on the user interface to prompt the player to claim their reward, encouraging further interaction and engagement. Referring to FIG. 3C, the screen may show instructions to continue playing or notifications about upcoming rewards. The screen can provide clear instructions or options for the player to continue their gameplay journey, such as returning to the main game, checking their inventory, or engaging with other features of the application. The gaming platform may be suitably adapted to present other meta-gaming off-gaming rewards and may not be limited to the aforementioned examples.

In some embodiments, the gaming platform may be configured to receive the progress made by the players in each of the games. The gaming platform may further include meta-gaming mechanics that gamify interaction of the players with the plurality of games, to further improve engagement. In some embodiments, the gaming platform may be configured to aggregate the data received from the games and analyze the data to provide additional rewards to the players.

FIG. 4 illustrates a schematic representation of a table 400 showing a mapping of the rewards corresponding to each player according to the meta-gaming mechanics within the leveling system. Referring to FIG. 4, the column lists various segments within the game. In one embodiment, each segment may represent different groups of players, levels, or categories of activities. In an embodiment, each segment may represent a specific player group or activity level within the gaming platform. In some embodiments, the weightings column comprises a numerical value corresponding to each segment. These values may represent the relative importance or influence of each segment within a reward mechanism of the game. For example, the progress from a first set of games (or segments thereof) may be valued higher than progress from a second set of games, according to the weightings assigned thereto.

FIG. 5 illustrates a schematic representation of a table 500 comprising level configurations as per the meta-gaming mechanics within the leveling system. Referring to FIG. 5, the table 500 comprises a level column representing the different stages or levels that players can achieve within the gaming platform. Each level may correspond to specific milestones or progress points that the players may attain over the course of playing the games on the gaming platform. The table 500 may further comprise an experience points (XP) column, wherein the XP is a metric that tracks the experience points earned by the users as they make progress in each of the games on the gaming platform, which may be used to determine the level of the players. Coins rewarded may indicate the number of in-game coins awarded to the players at each level, examples of which are shown in a coin rewarded column. The table 500 further comprises a cash required (100XP) column that represents the amount of real-world money required to purchase 100 experience points. 'Cash equivalent rewards' may represent the real-world monetary value equivalent to the in-game rewards provided at each level and is illustrated in a cash equiv. rewarded column. A 'Level Return to Player (RTP)' column may comprise a percentage that indicates the amount of money returned to players in the form of the rewards, for games involving placing of parlay bets based on performance of the players in multiple games of the gaming platform. A 'cumulative cash bet' column 514 may track the total amount of real-world money that the players have bet cumulatively at each level. A 'cumulative coins won' column may represent the total number of in-game coins won by the users cumulatively at each level. This may help in understanding the total rewards distributed in the form of off-gaming currency. A cumulative cash won column may represent the total amount of real-world money won by the player cumulatively at each level. Such metrics may be used for evaluating the overall financial return to players and the effectiveness of the reward mechanism.

Figure 6:
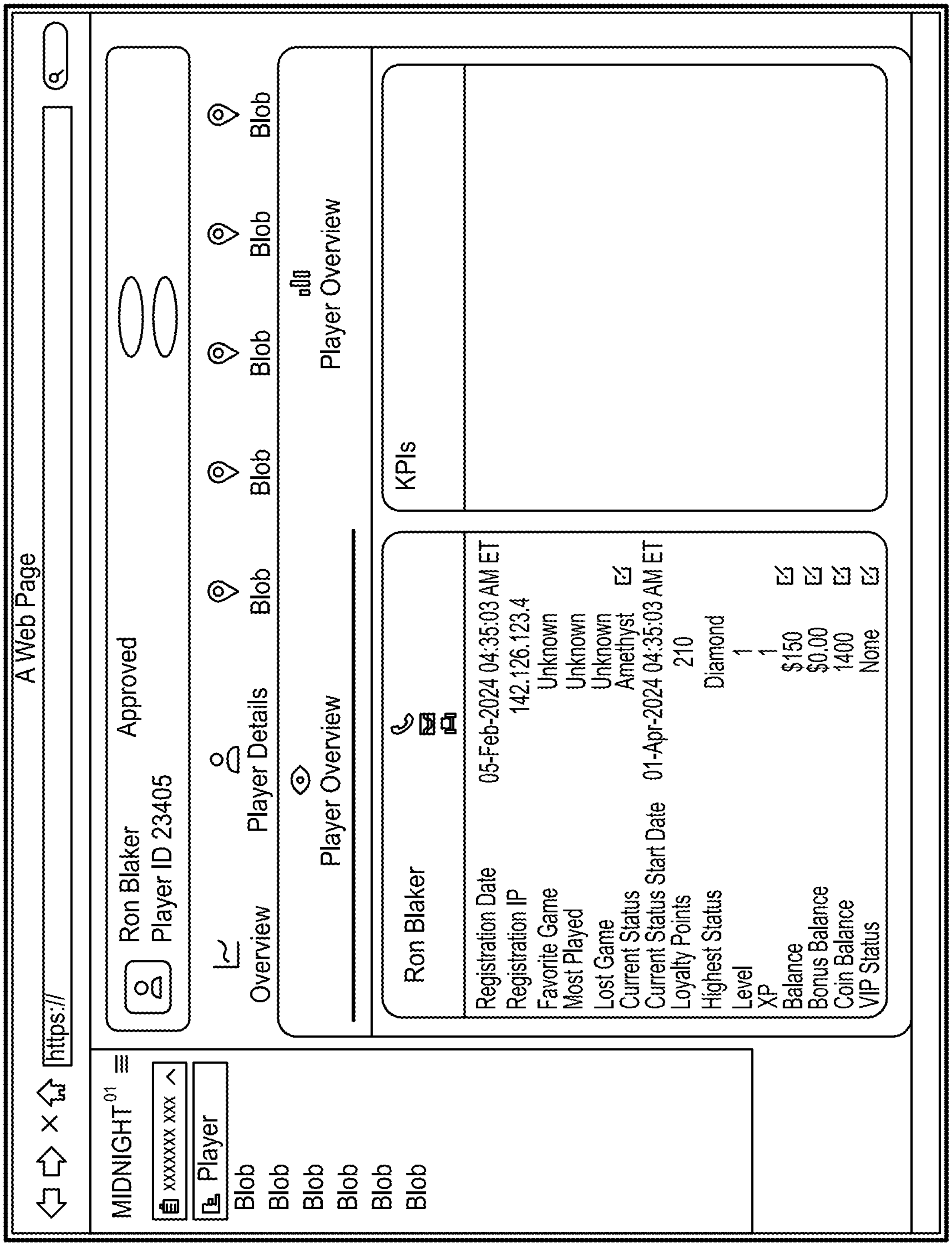
FIG. 6 illustrates a schematic representation of player activity data, in accordance with an example implementation.

FIG. 6 illustrates a schematic representation 600 of player account data, in accordance with an example implementation. The player account data may be made available on one of the UIs of the gaming platform. The UI may include multiple metrics, such as the number of games played, points earned per session, loyalty points accumulated by the player in a session, highest status, account/betting balances, Key Performance Indicators (KPIs), and progression over time. KPIs may include, but are not limited to, a player's RTP, Average Bet, Average Deposit, Last deposit Date, Total Number of Deposits, Average Withdrawal, Last Withdrawal Date, Maximum Balance, Date of Maximum Balance, and/or Last Action Taken. Such UI may be used both by the players to track their progress, as well as the back office to study the players and introduce further games or meta-gaming mechanics to improve player engagement.

For example, the player activity data may be used for determining which level or tier/status that the players belong to. Each level/tier according to the meta-gaming mechanics of the gaming platform may provide different features and limitations to the players. FIG. 7A illustrates a schematic representation 700A of features and limitations of a leveling system. The leveling system may comprise specific limitations in accordance with different levels/tiers for the players as per the meta-gaming mechanics. For example, a multiplier base wheel 702 is a feature of the leveling system that may allow the players to multiply their rewards obtained/earned based on an off-gaming or meta-gaming mechanic, such as a daily wheel spin. The players spin the wheel, and the outcome determines the multiplier applied to their rewards, such as points or bonuses. 'Member levels' or 'Member Status' 704 may be represented by terms like amethyst, topaz, aquamarine, opal, emerald, ruby, sapphire, and diamond, for example. Different multipliers may be applied based on the member level of the player.

Similarly, 'status level' 706 may reflect the rank of the player within the leveling system. Higher status levels unlock additional benefits and rewards, motivating the players to remain active and engaged. In the table shown, 28-day minimum and maximum speed metrics may indicate the minimum and maximum progression speeds for players over a 28-day period. Further, the daily wheel multiplier may represent the average multiplier applied to the rewards when players spin the daily wheel. 'Average daily wheel prize' may indicate the typical prize amount that players can expect to win from the daily wheel spin. 'Maximum RTP Metrics' show the highest return players can achieve if they are active for at least one day, two days, twelve days, or the entire 28-day period. The RTP metrics may indicate the potential rewards players can receive based on their activity levels, member level, status level, and the like, thereby encouraging sustained engagement. 'Minimum RTP metrics' show the lowest return players can achieve if they are active for at least one day or the entire 28-day period, thereby providing a baseline for the minimum rewards players can expect and ensuring transparency and fairness in the reward system. FIG. 7B illustrates one or more embodiments of rewards or perks table 700B associated with each status level. In some embodiments, players may increase their status level 706 by purchasing/opening boxes within a specified time limit, such as every 28 days. In some embodiments, in order to prevent being reverted to a lower status level 706, players may be required to purchase/open at least one box. In the same or other embodiments, players may be required to open a specified number of boxes in order to increase their status level 706. In still more embodiments, each status level may be associated with specified perks or rewards such as special wheel spins, sweepstake entries, or free boxes. Players are motivated to remain active and engaged in order to prevent their status level from dropping and also achieve higher status levels to increase their rewards.

Figure 13:
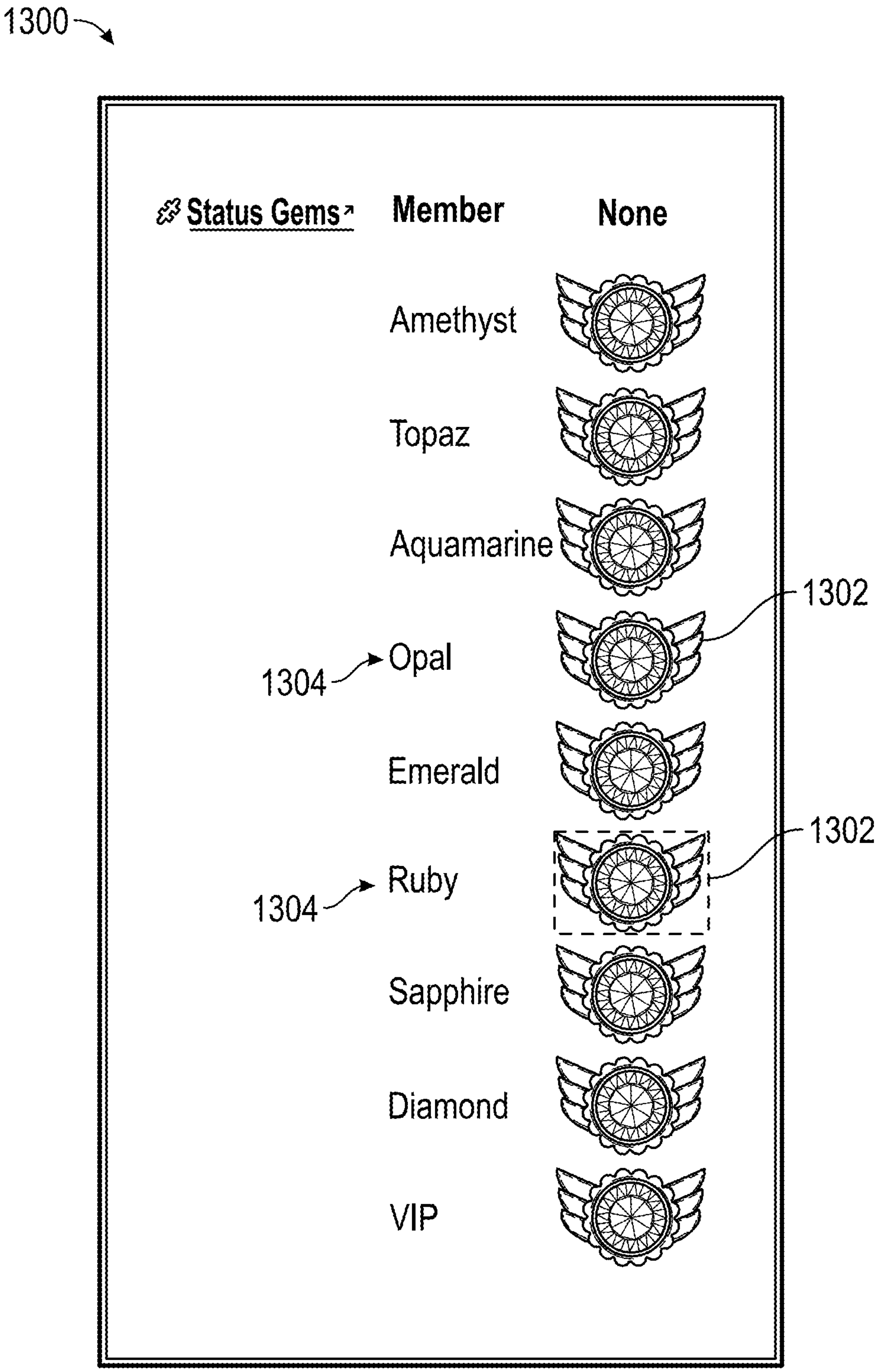
FIG. 13 illustrates one embodiment of member status in accordance with one or more embodiments of the present disclosure.

FIG. 13 illustrates a status level table 1300 listing various images in the form of status badges 1302 associated with various status levels 1304. In one or more embodiments, each status level 1304 may be assigned and depicted with a unique status badge 1302. For example, Emerald Status may be depicted by a winged badge with a green or emerald stone in the center while Sapphire Status may be depicted by a winged badge with a blue or sapphire stone in the center. The status badges 1304 may be designed to be visually appealing and appear to have increasing worth as a player increases their status level. The appearance of increasing in worth may serve to motivate the player to continue with game engagement to further increase their status level.

Figure 8:
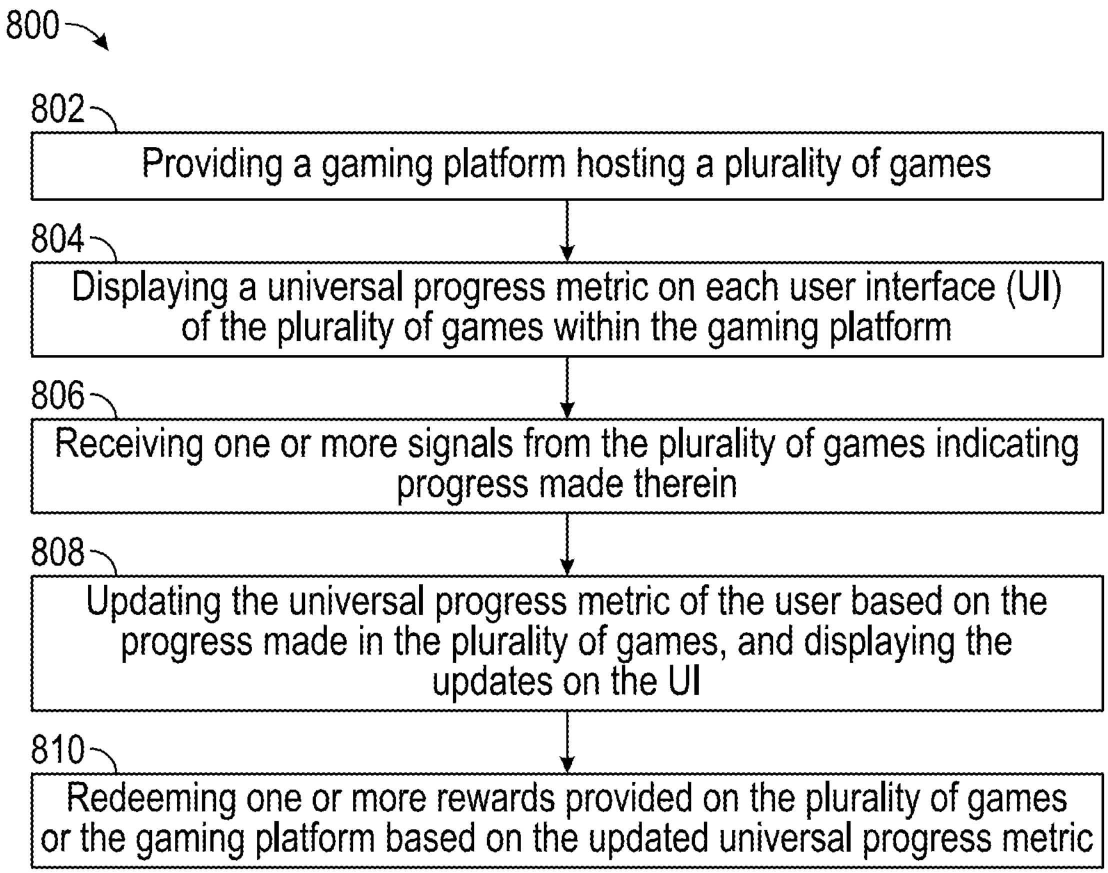
FIG. 8 illustrates a flowchart of a method for tracking the universal progress of the player and distributing the rewards based on the universal progress in the gaming platform, in accordance with an example implementation.

FIG. 8 illustrates a flowchart of a method 800 for tracking the universal progress of the player and distributing the rewards based on the universal progress in the gaming platform, in accordance with an example implementation.

Referring to FIG. 8, at step 802, the method 800 may include providing a gaming platform hosting a plurality of games. The games may have the same or different game mechanics. In an embodiment, any of the plurality of games may be licensed, or otherwise obtained, from third parties. For example, the games may be known games, for example known slot games such as Buffalo King™, Big Bass™ Bonanza, and Fruit Party™. Further, in an embodiment, any of the plurality of games may be unique to the gaming platform. Of course, other games may be utilized, such as virtual poker, roulette, craps, and blackjack, and the aforementioned are provided as non-limiting examples only.

In some embodiments, the gaming platform may comprise an interface that permits the players to select the plurality of games and may redirect the player to the selected game. In an embodiment, the game may be hosted on a third-party gaming site and/or server and upon selection of the game, the system may redirect the player to the site. In such an embodiment, the third-party gaming site and/or server may be in communication with the gaming platform to permit the universal progress bar to be displayed and updated, as discussed in more detail herein. In other embodiments, the game may be at least partially hosted on the gaming platform and the universal progress bar may be displayed and updated, as discussed in more detail herein. In still other embodiments, the game may be wholly hosted on the gaming platform and a copy of the game may be stored within the host server/system.

At step 804, the method 800 includes displaying a universal progress metric on each UI of the plurality of games.

The universal progress metric may be displayed as a progress bar designed to track the cumulative progress of the player across all games.

At step 806, the method 800 includes receiving one or more signals from the plurality of games indicating progress made therein. Whenever the player engages in any game, progress made in the games is added to the universal progress bar. Such integration may ensure that the progress of the players is continuously monitored and updated in real-time.

At 808, the method 800 may include updating the universal progress metric of the player based on the progress made in the plurality of games and displaying the updates on the UI. The updates may be realized synchronously to reflect the achievements, points, and milestones of the player from all the games within the gaming platform in real time. As the player completes levels, earns points, or unlocks achievements, these actions are dynamically updated in the universal progress metric. The dynamic updates may provide instant feedback, keeping the player informed of their current status and goals.

At 810, the method 800 may include redeeming one or more rewards provided on the plurality of games or the gaming platform based on the universal progress metric. For example, when the universal progress metric reaches a threshold value, off-game rewards or meta-game rewards, such as a free spin on a spin wheel or a sweepstakes entry, may be provided to the player. In another example, the universal progress metric may provide soft currency (e.g., credits, tokens, coins, prize/loot boxes, sweepstake entries and/or soft currency) to the players, which may be used to make in-game purchases within one of the games, or purchase products from an e-commerce interface provided by the gaming platform as discussed below in reference to FIG. 12.

Figure 9:
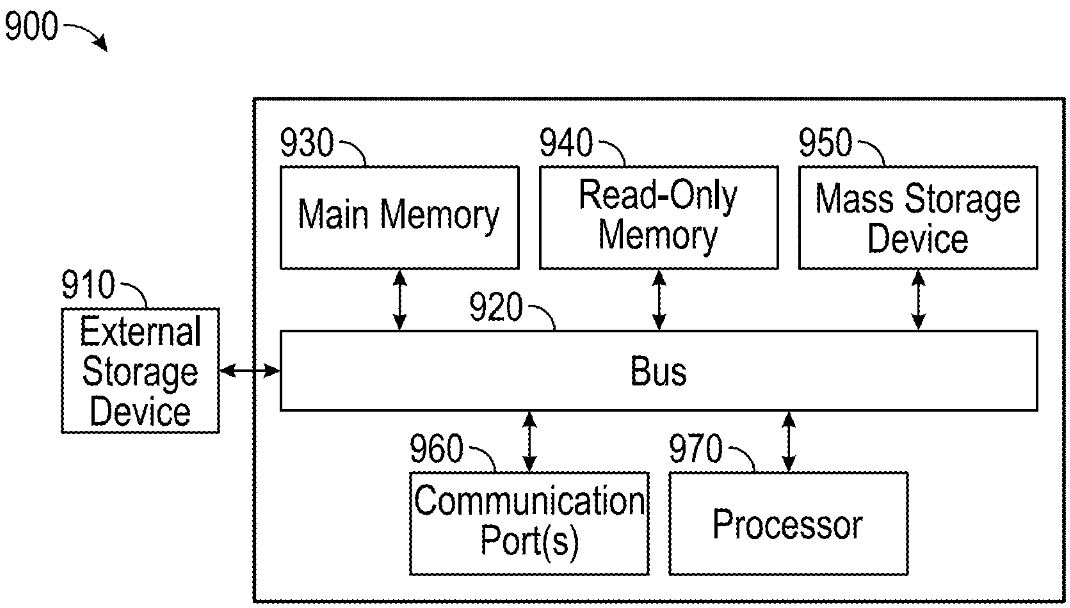
FIG. 9 illustrates an example computer system in which or with which the embodiments of the system may be implemented, according to embodiments of the present disclosure.

The system 102 illustrated in FIG. 1 and the method 800 illustrated in FIG. 8 may be implemented on a computer system. Referring to FIG. 9, the block diagram represents a computer system 900 that includes an external storage device 910, a bus 920, a main memory 930, a read only memory 940, a mass storage device 950, a communication port 960, and a processor 970. A person skilled in the art will appreciate that the computer system 900 may include more than one processor 970 and communication ports 960. The processor 970 may include various modules associated with embodiments of the present disclosure. The communication port 960 may be any of a Recommended Standard 232 (RS-232) port for use with a modem-based dialup connection, a 10/100 Ethernet port, a Gigabit or 10 Gigabit port using copper or fiber, a serial port, a parallel port, or other existing or future ports. The communication port 960 may be chosen depending on a network, such as a Local Area Network (LAN), a Wide Area Network (WAN), or any network to which computer system 900 connects.

In an embodiment, the memory 930 may be a RAM, or any other dynamic storage device commonly known in the art. The Read-Only Memory (ROM) 940 may be any static storage device(s) e.g., but not limited to, a Programmable Read-Only Memory (PROM) chip for storing static information. The mass storage device 950 may be any current or future mass storage solution, which may be used to store information and/or instructions. Exemplary mass storage solutions may include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g., an array of disks (e.g., SATA arrays).

In an embodiment, the bus 920 communicatively couples the processor(s) 970 with the other memory, storage, and communication blocks. The bus 920 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects the processor 970 to the computer system 900.

In another embodiment, operator and administrative interfaces, e.g., a display, keyboard, and a cursor control device, may also be coupled to the bus 920 to support direct operator interaction with computer system 900. Other operator and administrative interfaces may be provided through network connections connected through communication port 960. In some embodiments, the external storage device 910 may be any kind of external hard-drives, floppy drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system 900 limit the scope of the present disclosure.

Figure 10:
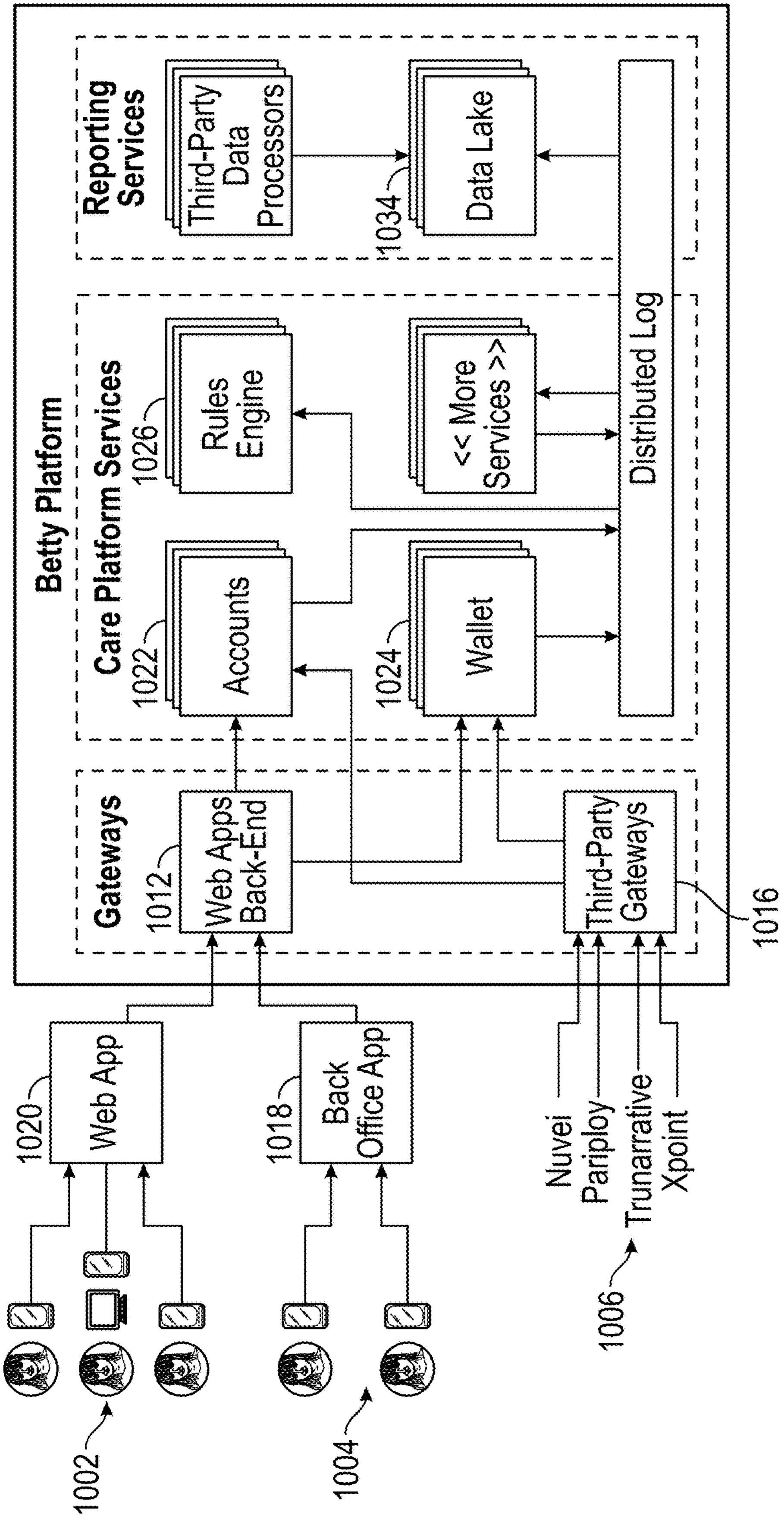
FIG. 10 illustrates a block diagram of the platform architecture associated with one embodiment of the system.

FIG. 10 illustrates a block diagram of the platform architecture 1000 associated with one embodiment of the system. As illustrated, the system may be interactive with three distinct parties, a player 1002, a back office/back-end 1004, and a third-party 1006. Each of these parties may have a unique gateway to interact with the system. For example, the player 1002 may interact with a web app gateway 1012 through a web app 1020, the back office 1004 may interact with a back office back-end gateway 1014 through a back-office app 1018, and the third-parties 1006 may interact with third-party gateways 1016. The web app gateway 1012 may allow the player 1002 to access and interact with the system.

A method for accessing the system is described herein. At a first step, the player 1002 may access the web app gateway 1012 to access an account stored in an account module 1022. In some instances, the account may be an existing account and accessible through a username and password. In other instances, the account may be created. In order to create the account, the system may receive the player's identifying information, for example, any of the player's name, age, gender, home and/or mailing address, phone number, email address, credentials, or other identifying information.

In addition, the system may be configured to verify the identity of the player 1002. In some embodiments, the system may verify the identity of the player 1002 by receiving a government identification number from the player. For example, a driver's license number, social security number, passport number, or any other government identification means. In an embodiment, the system may receive a copy of the player's driver's license. In some such embodiments, the system may further require a visual match between the player's driver's license and a real-time photo of the player. This may be performed by a third-party software or integrated into the system itself.

Accessing the account may, in some embodiments, require multi-factor authentication. In some embodiments, this may include sending a code to a phone and/or email address or answering a security question. The use of multi-factor authentication is contemplated to ensure that the individual accessing the account is the player associated with the account.

In the architecture illustrated in FIG. 10 the player account may be stored within a privileged access management (PAM) system. The player account may be accessible by the player through the web app gateway 1012, as well as by the back office through the back office back-end gateway 1014.

Further, the location of the player may be verified. For example, the player's location may be verified using an IP address of the player server, GPS, cellular networks, or any other method of geolocating the player. It is contemplated that some content of the system may be restricted in certain locations, for example in different countries, states, provinces, or counties. As a result, by geolocating the player upon accessing the system, the system may ensure that the provided content is in accordance with existing laws and regulations in their region.

Upon verifying the player account and the location of the player, the player 1002 may access the system. For example, the player may access third-party games offered on the platform.

Further, the platform architecture 1000 may comprise a wallet module 1024. In an embodiment, a wallet may be associated with the player account. The wallet may comprise hard currency, corresponding to actual money, and soft currency, corresponding to the universal progress bar and/or Loyalty module.

As illustrated in FIG. 10, the wallet module 1024 may be accessible by any of the player, the back office, and third-party may have access to the wallet. It is contemplated that each of the users may have varying levels of access to the wallet module 1024, as discussed in more detail herein.

The player 1002 may utilize the hard and/or soft currency to play the games. Depending on the results of the game, currency may be added or subtracted from the player's wallet. For example, when the player 1002 bets money and loses the bet, hard currency may be transferred from the player's wallet to a wallet associated with the third-party 1006 hosting the game and/or the back office 1004. In contrast, if the player 1002 wins the bet, hard currency may be transferred from the wallet associated with the third-party 1006 and/or the back office 1004 to the player's wallet.

The hard currency can be withdrawn from the player's wallet and transferred to a bank account, gift card, or another financial account that the player designates. In some embodiments, the hard currency in the player's wallet may be withdrawn at any time, with no minimum criteria. In an embodiment, a minimum amount threshold may be implemented and the player 1002 may only withdraw hard currency when the withdrawal exceeds the minimum amount. In one embodiment, there may be a maximum amount that may be withdrawn at one time. In some such embodiments, the player 1002 may be permitted to withdraw more than the maximum amount if specific criteria are met. For example, the player's identity is further verified, a transfer delay is instituted (e.g., the transfer may take 72 hours to be completed), or the financial account has been previously utilized to transfer hard currency.

Further, in some embodiments, a soft currency may be added or subtracted from the player's wallet. The soft currency may be a currency specific to the system. For example, the soft currency may be coins (e.g., BettyCoins), points, and/or experience (XP). In some embodiments, the system may comprise a store where the soft currency may be exchanged for "in-game" rewards on a digital marketplace. For example, the soft currency may be exchanged for free spins, power-ups, bonuses, or other rewards. Of course, the soft currency may be exchanged for other goods and/or services, for example discounts on third-party sites, non-fungible tokens (NFTs), and other goods and/or services.

The soft currency may be a currency exchanged between the player's wallet and the back office's wallet. For example, the soft currency may be deposited into the player's wallet from the back office's wallet upon the occurrence of an event, for example, upon interacting with the system, "leveling-up," or winning a bet. The soft currency may be exchanged in the digital marketplace in exchange for the "in-game" rewards.

In some embodiments, the soft currency may have no value outside of the system and may not be transferable to real currency. In an embodiment, hard currency may be utilized in the digital marketplace to purchase any of the "in-game" rewards. For example, hard currency, or a combination of hard and soft currency, may be utilized to purchase any of the "in-game" rewards offered on the digital marketplace.

Returning to FIG. 10, the system may comprise a Rules Engine module 1026 that processes asynchronous platform events for the purpose of platform automation. Further, the system may comprise a game management system (GMS) module that holds the configuration of all games available on the platform. For example, the GMS may manage games from a plurality of third-party gaming servers and/or from the host server. In an embodiment, the system may further comprise an Audit module, which may be a service that holds audit data for all interactions associated with the player account. In an embodiment, the back-end user may have access to the Audit module to permit oversight of the player account. One example of information that may be displayed as part of the Audit module is provided with reference to FIG. 6.

In some embodiments, the system further comprises a Notifications module, which may provide a centralized handling of platform notifications delivered to the player 1002. For example, the Notifications module may handle notifications sent through email, text, and/or pop-up messages. In an embodiment, the system may further comprise a Loyalty module that monitors and maintains the player's loyalty data. The Loyalty module may be at least partially integrated with the wallet and may inform payout amounts. For example, the Loyalty module may inform the player's member and/or status level (e.g., amethyst, topaz, aquamarine, opal, emerald, ruby, sapphire, and diamond) and an associated multiplier. Examples of the Loyalty module are illustrated in FIGS. 4, 5, 7A and 7B.

In some embodiments, the Loyalty module may generate campaigns, journeys, and/or promotions. It is contemplated that in some embodiments, the campaigns, journeys, and/or promotions may be specifically catered to an individual player. In other embodiments, the campaigns, journeys, and/or promotions may be universal, and any player 1002 may have access to them. Still, in further embodiments, the campaigns, journeys, and/or promotions may be both specific to the player 1002 and universal to all players. One example of a campaign may require that the player 1002 transfers a pre-determined amount of hard currency into their player wallet. Further, the player may be required to access the gaming platform within a certain time period, for example, on a specific date or a number of dates in a row. Additionally, the player may be required to reach a certain level, have a specific member status, or reach a certain point on their universal progress to gain access to certain games or features. Other campaigns, journeys, and/or promotions are contemplated, and the aforementioned example is provided as a non-limiting example only.

The system may further comprise a Data Lake module 1034 which collects and stores information within the system. For example, in some embodiments, the system may maintain a record of each interaction between the player 1002 and the platform. In an embodiment, the interactions between the player 1002 and the platform may be secured, for example, tokenized or encrypted, in order to authenticate interaction between the users. For example, all interactions executed by the player 1002 may be attributed to them via a unique player ID at the host server.

In an embodiment, the Data Lake module 1034 may be connected with the Audit module to permit auditing of the gaming platform and/or player(s). Further, in an embodiment, the Data Lake module 1034 may be connected to the Loyalty module. In still a further embodiment, the Data Lake module 1034 may be connected to the wallet module 1024. It is contemplated that any module in the game platform architecture 1000 may be connected to another module and the aforementioned are provided as non-limiting examples.

In some embodiments, the back end 1004 may have access to any of the information stored on the host server. In such embodiments, the back-end 1004 may access a back-end user interface to view any of the information stored in the Data Lake module 1034. For example, the back office 1004 may be able to see any of the information stored in the Audit module and/or the Loyalty module. The back office 1004 may use any of the information stored in the Data Lake module 1034 to customize the system for the player 1002. For example, generating campaigns, promotions, and/or journeys at the Loyalty module that can then be provided to the player 1002.

Further, in some embodiments, the Loyalty module may be utilized to provide an incentive and/or award to the player 1002. For example, the Loyalty module may be utilized to add hard and/or soft currency to the player's wallet.

In an embodiment, the Data Lake module 1034 may collect and store information related to any of the users accessing the system, regardless of whether the users are interacting with one another. This may be utilized to track all interactions with the system and may be monitored by the back-end user 1004. In one embodiment, the back end 1004 may be able to view each player profile and may be able to search/filter the player profiles by various parameters. For example, region, sign-up period, name, age, a player identification number, or any other parameter.

The gaming platform may be utilized for a plurality of different gaming purposes. Exemplary embodiments of such use cases are provided herein; however, any suitable gaming purpose may be utilized and the embodiments listed below are provided for example only.

Example 1: Gambling

In some embodiments, the gaming platform may be configured as a gambling platform to permit the wagering of hard and/or soft currency on an event with an uncertain outcome. For example, the gaming platform may permit wagering on games such as slots, roulette, blackjack, baccarat, craps, keno, poker, sports betting, bingo, pai gow, and pachinko.

In some embodiments, the player may select a gambling game at the gaming platform and the game may be loaded on the player's device. The gaming platform may receive consideration transmitted from the player server, in the form of a bet and/or stake, which the player risks losing. The bet and/or stake may be hard and/or soft currency. The player may then interact with the game, for example, spinning the slots or holding, to initiate the game. Of course, in some embodiments, such as sports betting, no action may be taken by the player following the consideration. In such an embodiment, the action may be independent of the gaming platform and the results may be received by the gaming platform. For example, in sports betting, the player may wager on a particular sporting event, and following the completion of the sporting event, the gaming platform may receive the results of the game in order to determine a result.

If the results of the game are favorable to the player, for example, the player placed a winning bet, the player may receive a prize. For example, the results may be favorable to the player when a specific combination of lines are spun in a slot game or when the player bets on a winning sports team. Of course, there are many types of favorable results, any of which may be indicative of the result of the game.

In an embodiment, the prize may be hard currency. In some embodiments, the hard currency awarded as a prize may be at least partially determined by the bet and/or stake provided as consideration. In one embodiment, the hard currency awarded as the prize may be at least partially determined by odds associated with the game. In still a further embodiment, the hard currency awarded as the prize may be at least partially determined by a degree of winning. For example, in slot games, there may be a plurality of favorable outcomes, each having a different probability of occurring. Each of the plurality of favorable outcomes may have a prize associated therewith. For example, with slot games different bet lines and/or multipliers may result in a favorable outcome and may affect the prize. Outcomes with a lower probability of occurring may return greater prizes, while outcomes with a higher probability of occurring may return smaller prizes in comparison.

In some embodiments, soft currency may be awarded to the player, even if the results of the game are not favorable to the player. Instead, the soft currency may be assigned according to an interaction with the platform. However, in some embodiments, the size or amount of soft currency may be at least partially dependent on the outcome. For example, a larger award of soft currency may occur when the outcome is positive when compared to the award of soft currency when the outcome is negative. Further, in some embodiments, the size or amount of soft currency may be at least partially dependent on the Loyalty module. Players with higher loyalty scores, for example, players with a higher universal progress metric may receive more soft currency than players with a lower universal progress metric.

In some embodiments, the type of currency won may be at least partially dependent on the currency used for the bet. For example, if the player wagers hard currency, hard currency may be awarded as the prize. Whereas, if the player wagers soft currency, soft currency may be awarded as the prize. Further, in some embodiments, both soft and hard currency may be awarded.

Example 2: Skill-Based Real Money Games

In some embodiments, the player may select a skill-based game on the gaming platform. Skill-based games may be any game where the outcome is determined by the player's skill, knowledge, and/or strategy, as opposed to merely luck or chance. For example, skill-based games may include fantasy sports, esports, rummy, chess, trivia games, puzzle games, or word games. Of course, other skill-based games may be provided and the aforementioned are provided as non-limiting examples.

In an embodiment, the gaming platform may connect a plurality of player users together. The plurality of players may be any number of players needed and/or desired to play a game. For example, in a game of chess only two players may be able to play, while in a game of trivia any number of players may be able to play. Each of the plurality of players may be in communication with the third-party gaming and/or host server to facilitate interaction. For example, the third-party gaming server and/or the host server may serve as a transactional server to permit the plurality of players to connect with one another. In one embodiment, the host server may track the player's progress and may communicate the progress to the player and/or third-party game server. In an embodiment, the third-party gaming server provides game data necessary to operate the game. In another embodiment, the game data can be exchanged directly between players over the host server.

In some embodiments, the plurality of players may be matched according to any of their skill-based score, availability, selected-game, or other factors. Further, in an embodiment, one or more of the plurality of players may be associated with another of the plurality of players. For example, a player may share a link and/or code with other players to permit a select group of players to interact with the same game.

In some embodiments, the skill-based games may comprise additional characteristics, such as high-stakes, low-stakes, expert, and/or novice. The player may select their desired skill-based game and/or the system may determine the player's ranking and provide only skill-based games at an appropriate level for the player. In one embodiment, each player may comprise a skill-based score stored in the Loyalty module, wherein the skill-based score is based on the player's historical skill-based metrics. In some embodiments, the skill-based score may be determined for each game and/or category of game. In other embodiments, the skill-based score may be based on a plurality of games. The skill-based score may be tracked and stored on the host server. In one embodiment, the skill-based score may be a factor reflected in the player's universal progress metric.

In one embodiment, the plurality of players may communicate with one another via the third-party gaming or host server during play. The players may be able to send any of pre-populated responses, free responses, emoticons, GIFs, and memes to the other players during play.

However, in other embodiments, the plurality of players may not be able to communicate with one another and interaction may be limited to playing the game.

In these games, the players may place a bet/wager on themselves. In some embodiments, the plurality of players may bet/wager against each other to create a prize pool. The prize pool may be at least partially utilized to provide a prize dependent on the outcome of the game, as discussed in more detail herein.

In one embodiment, multiple players may be connected and may play against each other, wherein the winning player receives at least a portion of the bet/wagers from the prize pool. In such an embodiment, the outcome may be that the player with the most progress at the end of the game may be the winning player. In an embodiment, the winning player may receive all of the bet/wagers from the prize pool. However, in other embodiments, multiple players may win, and the prize pool may be distributed among the winning players. In still a further embodiment, a portion of the bet/wagers may be retained in the third-party gaming wallet as an entrance fee for the game. In another embodiment, the player may pay a separate admittance fee in order to access the game. Of course, in still another embodiment, the game may be free to play, and no fee may be required to access the game.

In an embodiment, the hard currency may be authenticated prior to the start of the game. In one embodiment, the hard currency may be authenticated by determining the hard currency in the player's wallet. This may be accomplished, in one embodiment, by the hard currency being present in the player's wallet. The amount of hard currency in the player's wallet may be authenticated by the wallet itself. In another embodiment, the hard currency may be authenticated by an independent source, such as the host server and/or the third-party gaming server. Of course, other methods of authenticating funds are contemplated and the aforementioned are provided as non-limiting examples only. It is contemplated that upon the authentication of the hard currency in the player's wallet, the player may be able to access the game.

In one embodiment, the hard currency may be transferred out of the player's wallet and stored in the back-end wallet for the duration of the game. It is contemplated that this may be one method to authenticate the hard currency. The back-end wallet may serve as a transactional wallet, wherein the hard currency corresponding to the bets/wagers are temporarily held in escrow until they are distributed according to the outcome of the game. Upon the outcome of the game being determined, the back-end wallet may distribute the hard currency to the appropriate player(s).

However, in other embodiments, the hard currency corresponding to the bets/wagers may remain in the individual player's wallet until the outcome of the game has been determined. In some such embodiments, the hard currency corresponding to the bets/wagers may be transferred directly between the players' wallets. In other embodiment, the hard currency may be transferred to the back-end wallet, or another non-player wallet, to facilitate the distribution of winnings. It is contemplated that this may be advantageous in multi-player games where several players are playing the same game.

In a further embodiment, the hard currency may be transferred to the third-party gaming wallet. The third-party gaming wallet may serve as a transactional wallet, wherein the third-party gaming wallet holds the prize pool until the outcome of the game is determined. In some such embodiments, a fee to access the game may be deducted from the prize pool. The fee may remain in the third-party gaming wallet regardless of the outcome.

Further, in some embodiments, the soft currency may be bet/wagered. This bet/wager may be independent of or collective with the hard currency bet/wager. In one embodiment, the soft currency may not be bet/wagered but may be provided as a reward. For example, the soft currency may be provided as an incentive for playing the game and every player may receive soft currency for playing the game. In an embodiment, the amount of soft currency provided to the player may be at least partially dependent on the outcome of the game. For example, the winner of the game may receive a larger share of soft currency in comparison to the loser. In games with several players, each player may receive a share dependent on their ranking in the game.

In some embodiments, the soft currency may be at least partially influenced by the player's universal progress metric. In such an embodiment, each user may have a different soft currency incentive that is at least partially dependent on the Loyalty module. For example, a higher universal progress metric may result in more soft currency being awarded to the player than another player of a lower universal progress metric having the same outcome.

Example 3: Sweepstakes

In one embodiment, the gaming platform may be a sweepstakes gaming platform, wherein there is no requirement for skill in order to win. Further, in some embodiments, the games on the sweepstakes gaming platform may be free to play. It is contemplated that the games may comprise a pay-to-play portion as well. Further, each player may receive a free-to-play allotment, for example a number of coins and/or allotment of spins that permit playing the game. Additional spins and/or coins may be purchased, for example, as part of the pay-to-play portion, and may permit extra opportunities to interact with the game.

It is contemplated that such games may meet the criteria of sweepstakes in a given area. For example, the gaming platform may be used for a promotional contest where winners are randomly selected from a plurality of players. No purchase may be required to access the game. In some instances, sweepstakes entries, such as promotional codes and/or credits may be obtained from a purchase, such as a grocery purchase or a pay-to-play purchase. Further, the sweepstakes entries may be obtained without a purchase, for example by mail or online. In one or more embodiments, players may be rewarded with one or more sweepstake entries upon leveling up, completing an achievement, or increasing their member status level. The winner of the sweepstake may be randomly selected, without any requirement of skill, judgment, or merit. In such an embodiment, the randomly selected winner of the sweepstakes is the outcome of the game. For example, the player may have to collect a certain number of unique codes or may play a non-skill game (e.g., slots and roulette). Further, the sweepstakes may comprise rules, eligibility, and public disclosure requirements to ensure regulatory compliance in the given area. For example, the sweepstakes may comply with a rule that states a sweepstakes entry of a player spending a significant amount of hard currency on the game does not experience any advantage over a player that spends little to no hard currency on the game.

In one embodiment, the player may receive a sweepstakes entry as a bonus when making a pay-for-play purchase. For example, the pay-for-play purchase may be a purchase to permit access to any of the plurality of games on the gaming platform. These purchases may, without limitation, be spins and/or coins that can be redeemed for access to a portion of the game.

The spins and/or coins available for purchase may correspond to hard currency, while the sweepstakes entries may be associated with soft currency. Each of the spins and/or coins and the sweepstake entries may, upon purchase, be stored within the player's wallet and be redeemable for access to the plurality of games on the gaming platform.

In one embodiment, the player may purchase spins and/or coins to be used with the gaming platform. Any of the spins and/or coins purchased may include sweepstakes entries, such as sweepstakes spins and/or coins. For example, the spins and/or coins available for purchase may be bundled, such that multiple spins and/or coins are purchased at one time. Each bundle may have an associated number of sweepstakes entries associated with it. The number of sweepstakes entries associated with a bundle may be dependent on any of a plurality of factors, including, for example, the Loyalty module, the universal progress bar, promotions, the amount of hard currency associated with the spins and/or coins, the size of the bundle, or any other factor.

The player may interact with a game on the gaming platform to utilize their spins and/or coins. In one embodiment, the gaming platform may comprise one game, however, in other embodiments, the gaming platform may comprise a plurality of games and the player may select one game to interact with. Upon accessing the game, the player may select the currency from their wallet they would like to wager.

Figure 11A:
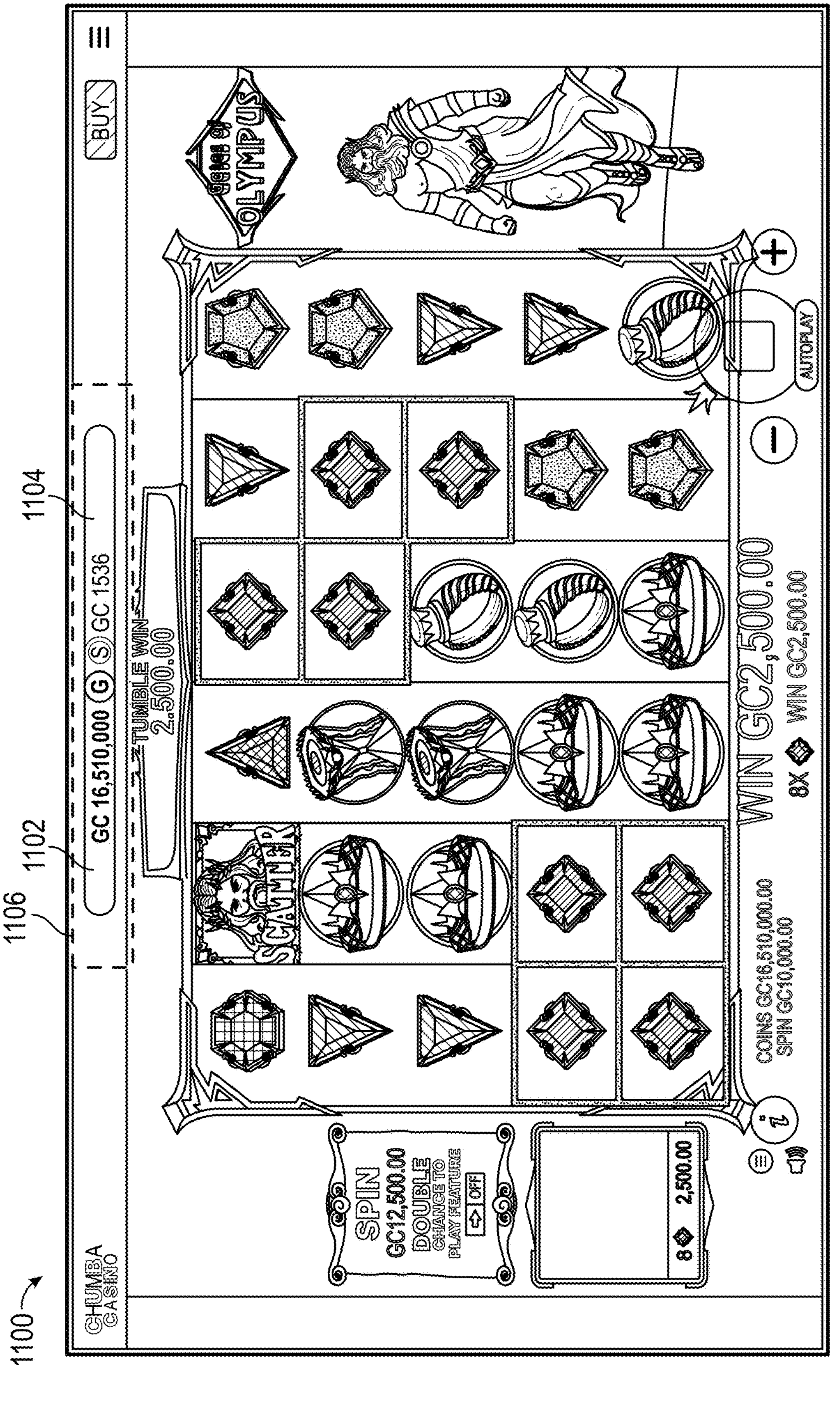
FIG. 11A illustrates one embodiment of the gaming platform for use with hard currency in accordance with one or more embodiments of the present disclosure.
Figure 11B:
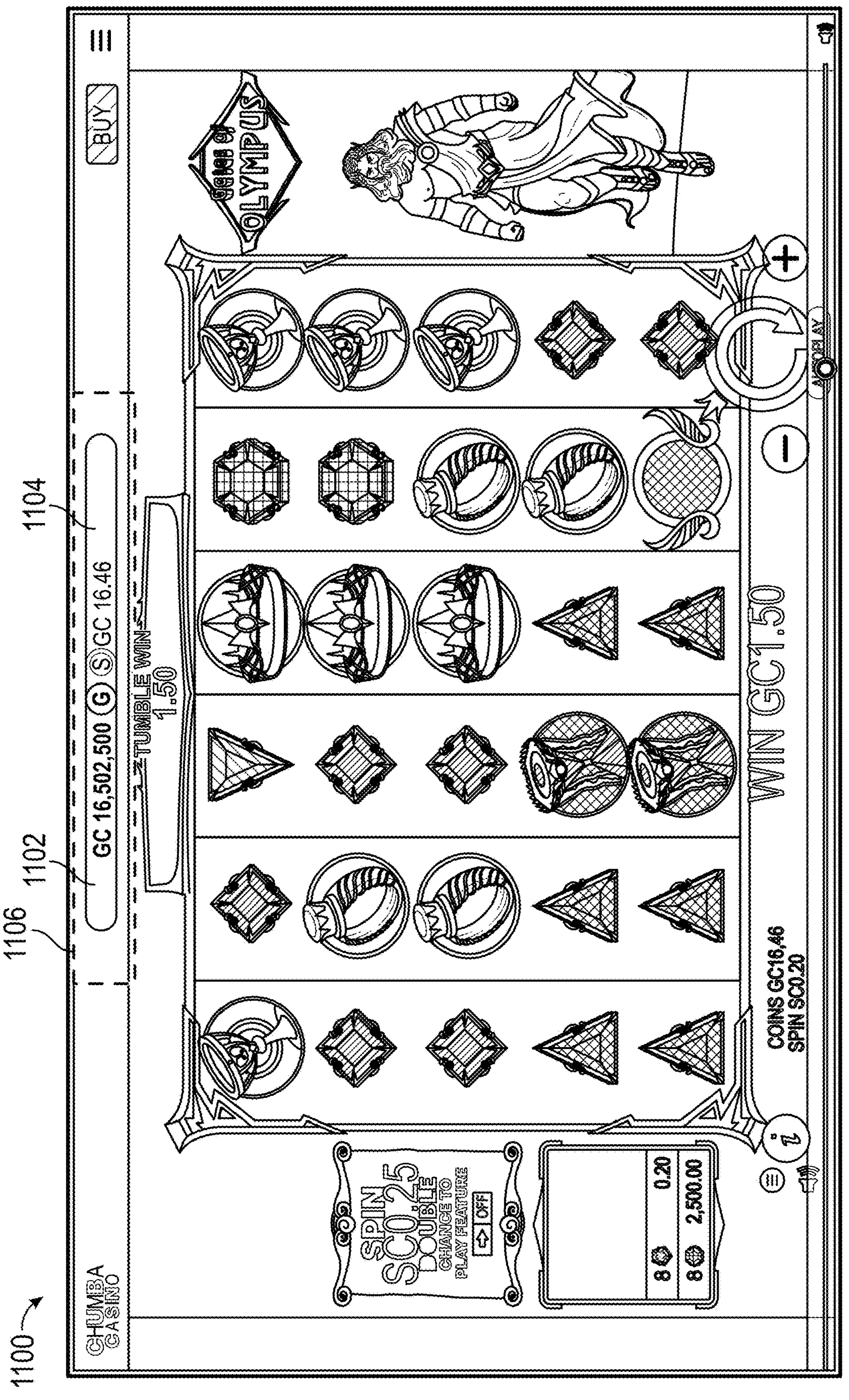
FIG. 11B illustrates an embodiment of the gaming platform for use with soft currency, according to embodiments of the present disclosure.

As illustrated in FIGS. 11A and B, the gaming platform 1100 may permit the player to toggle between the spins and/or coins 1102 and the sweepstakes entries 1104. The universal progress bar 1106 may display the spins and/or coins 1102 and the sweepstakes entries 1104 stored in the player's wallet, making it universally accessible across the gaming platform 1100. The player may toggle between the spins and/or coins 1102 and the sweepstakes entries 1104 by selecting the desired currency means from a universal progress bar 1106. In FIG. 11A, the spins and/or coins purchased by the player are bet/wagered. FIG. 11B illustrates an embodiment where the sweepstakes entries are bet/wagered. The bet/wager made by the player may determine the currency that is used for the winning payout. For example, FIG. 11A may result in a winning payout in spins and/or coins, while the winning payout in FIG. 11B may result in a winning payout in sweepstakes entries and/or prizes. The payout may be saved in the player's wallet and displayed on the universal progress bar 1106.

Of course, in some embodiments, the gaming platform may permit the spins and/or coins and the sweepstakes entries to be bet/wagered simultaneously. In such an embodiment, it is contemplated that the winnings may be proportionate to the share of spins and/or coins and the sweepstakes entries that were bet/wagered. For example, if the winning payout is 1:1, a bet of one coin may result in a winning of one coin and a bet of one sweepstakes coin may result in the winning of one sweepstakes coin. While described as the same, the winning payout may vary between the spins and/or coins and the sweepstakes entries may be different.

Of course, in some embodiments, one game may be specific to sweepstakes entries, and another may be specific to the spins and/or coins that were purchased.

Figure 12:
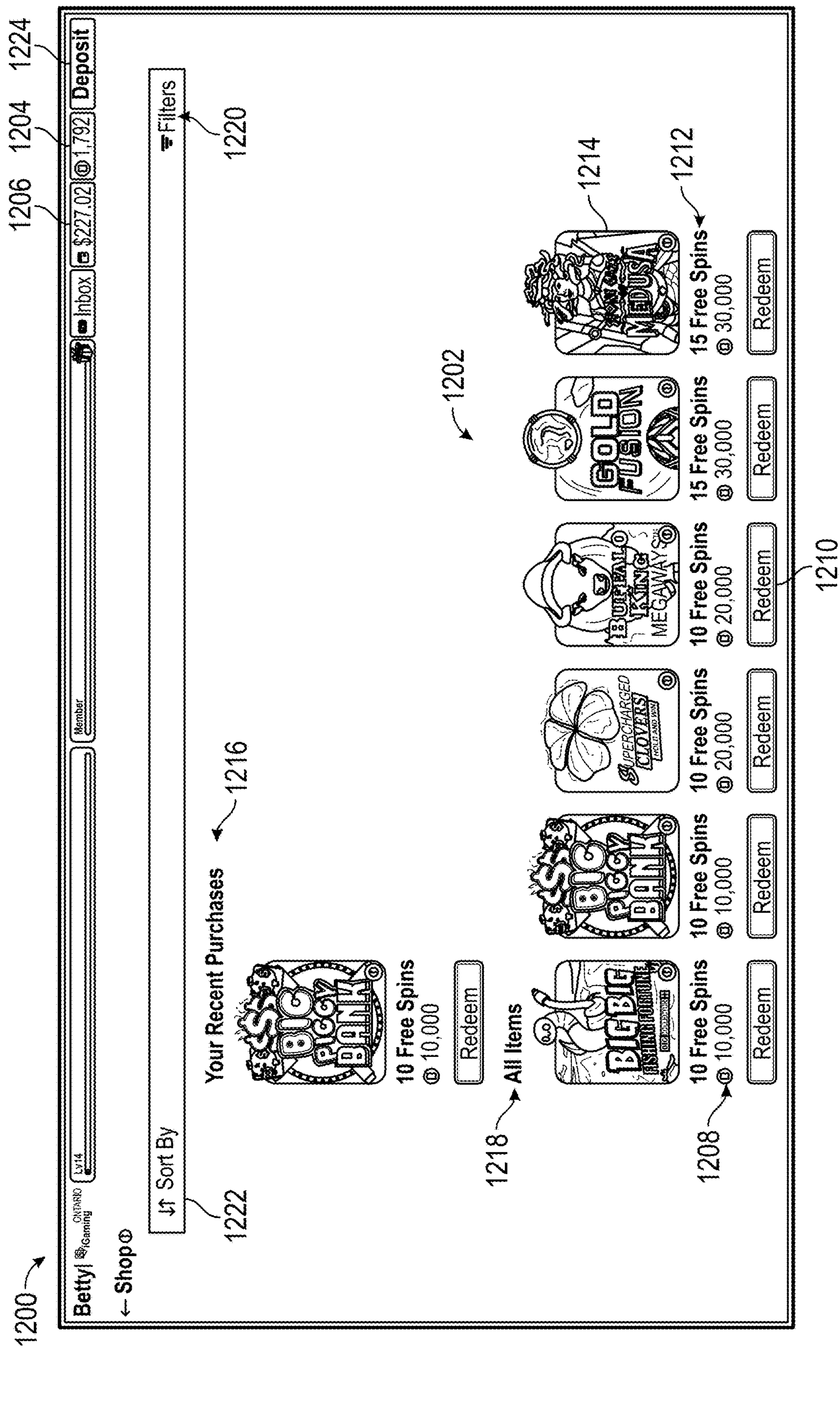
FIG. 12 illustrates an embodiment of a digital shop in accordance with an example implementation.

Referring to FIG. 12, an exemplary illustration of a universal digital store/marketplace 1200 can be seen. The digital marketplace 1200 may display either or both a soft currency 1204 and a hard currency 1206 in a player's wallet. In some embodiments, a deposit button 1224 may be present where a user may deposit funds in the form of a hard currency. In one or more embodiments, the digital marketplace 1200 may show various purchasable items 1202. In such an embodiment, the purchasable items may be separated into various categories such as recent purchases 1216 and all items 1218. It is contemplated that there may be any number of categories the purchasable items 1202 may be separated into. For example, it may display categories including, but not limited to, most purchased items, discounted items, time limited items, items specific to a particular game, or the like. In some embodiments, each of the purchasable items may include various descriptors about the item including, but not limited to, an item cost 1208 representing the value of the item, a redeem button 1210 in which a user may select to purchase the item, a description 1212 of the item indicating what the purchasable item is, and a game image 1214 associated with the item. In one or more embodiments, a user may apply a filter to the purchasable items 1202 so as to only display items from a particular category or items meeting certain criteria such as a cost threshold or a number of spins threshold. In the same or other embodiments, the user may be able to sort the purchasable items 1202 by selecting the Sort By button 1222. It is contemplated that the purchasable items 1202 may be sorted in various ways including, but not limited to, alphabetically, by game, by cost, or the like. While FIG. 12 illustrates purchasable items 1202 being a number of free spins for a particular game in exchange for a specified amount of soft currency, it will be appreciated by one skilled in the art that the items may also be exchanged for another in-game reward besides the soft currency or hard currency. It will also be appreciated that other items may be purchased, such as soft currency for hard currency, spin multipliers, experience for the universal progress bar, daily/weekly wheel spins, status upgrades, prize/betty boxes, various perks, sweepstake entries, or the like.

In one or more embodiments, there may be a method of tracking universal progress across a plurality of module platforms. In such embodiments, the method may include: receiving, at a host server, a request from a user account to access a module platform, wherein the user account comprises user identifying information, a user wallet, and a loyalty program; determining, at the host server, whether the user account meets criteria to access the module platform; responsive to the user account meeting the criteria to access the module platform, displaying, on a graphical user interface of a user's device, a plurality of modules accessible via the module platform; receiving, at the host server, a request to access a module; initiating, at the host server, the module, wherein initiating the module comprises displaying the module and a universal progress bar on a graphical user interface on a user's device, wherein the universal progress bar is associated with the loyalty program; receiving, at the host server, a wager associated with a currency in a user wallet; determining an outcome of the module; based at least in part on the outcome of the module, determining a loyalty score and responsive to the outcome being a success, the user account is awarded a reward; and associating, at the host server, the reward with the user wallet and the loyalty score with the loyalty program, wherein the loyalty score increases the universal progress bar.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Moreover, other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

The invention claimed is:

1. A method for tracking universal progress across multiple games on a gaming platform, the method comprising:

providing, at a host server, a plurality of games accessible via the gaming platform;

initiating, at the host server, a first game of the plurality of games, wherein initiating the first game comprises displaying the first game and a universal progress bar on a graphical user interface of a player's device;

receiving, at the host server, data indicating progress made by a player account in the first game;

updating the universal progress bar based on the progress made in the first game;

initiating, at the host server, a second game of the plurality of games different from the first game, wherein initiating the second game comprises displaying the second game and the updated universal progress bar on the graphical user interface of the player's device;

receiving, at the host server, data indicating progress made by the player account in the second game; and updating the universal progress bar based on the progress made in the second game, wherein the universal progress bar reflects cumulative progress across the first game and the second game.

2. The method of claim 1, further comprising displaying the updated universal progress bar on the graphical user interface during gameplay of any of the plurality of games on the gaming platform.

3. The method of claim 1, wherein at least a first portion of the plurality of games is hosted on the host server.

4. The method of claim 1, where at least a second portion of the plurality of games is hosted on a third-party server.

5. The method of claim 4, wherein providing access via the gaming platform comprises providing access to the second portion of the plurality of games hosted on the third-party server.

6. The method of claim 1, wherein the data indicating progress comprises any of level completion data, earned points data, activity data, and unlocked achievement data.

7. The method of claim 1, wherein the cumulative progress may be redeemed for awards.

8. A method for tracking cumulative universal progress and providing rewards in a gaming platform comprising a plurality of games, the method comprising:

receiving, at a host server, one or more signals from each of the plurality of games played by a player, each of the one or more signals indicating progress generated by gameplay actions, the progress measured by a native point system;

converting, at the host server, the native point system into universal point system values;

aggregating, at the host server, the universal point system values from the plurality of games to generate a universal progress metric that represents a cumulative progress of the player across all games;

dynamically updating, at the host server, a universal progress bar to reflect the universal progress metric in real time;

determining, at the host server, that the universal progress metric has reached a predetermined threshold corresponding to a reward level; and responsive to the universal progress metric meeting the predetermined threshold, awarding a reward to the player by crediting a reward value to a player wallet associated with the player's account.

9. The method of claim 8, wherein the conversion from the native point system to the universal point system values is based on game-specific weighting.

10. The method of claim 8, wherein the universal progress bar is displayed on a graphical user interface of a player's device.

11. The method of claim 10, further comprising displaying the universal progress bar on the graphical user interface during gameplay of any of the plurality of games on the gaming platform.

12. The method of claim 8, further comprising displaying, on the graphical user interface, an indication of the updated universal progress metric and the awarded reward, wherein the awarded reward is redeemable for in-game bonuses, digital goods, or cross-game benefits.

13. The method of claim 8, wherein the one or more signals may be generated from any of level completion data, earned points data, activity data, and unlocked achievement data.

14. At least one non-transitory computer-readable medium comprising a plurality of instructions that, when executed by at least one processor, are configured to:

host, on a host server, a gaming platform, the gaming platform comprising a plurality of games;

host, on the host server, a player account, wherein the player account comprises a player wallet comprising a form of currency;

host, on the host server, a digital marketplace;

host, on the host server, a loyalty program;

initiate, at the host server, a game of the plurality of games;

receive, at the host server, a wager associated with the form of currency;

determine an outcome of the game;

based at least in part on the outcome of the game, determine a loyalty score and responsive to the outcome being a win, the player account is awarded a prize; and associate, at the host server, the prize with the player wallet and the loyalty score with the loyalty program, wherein the loyalty score increases a universal progress bar; and display, on a graphical user interface of a player's device, the universal progress bar, wherein the universal progress bar displays a player's progress across all of the plurality of games.

15. The at least one non-transitory computer-readable medium of claim 14, wherein the form of currency comprises a soft currency, and wherein the digital marketplace comprises a soft currency shop which permits the soft currency to be exchanged for an in-game reward.

16. The at least one non-transitory computer-readable medium of claim 15, the soft currency corresponding to soft currency specific to the gaming platform.

17. The at least one non-transitory computer-readable medium of claim 14, wherein the loyalty program tracks the player's progress across any of the plurality of games hosted on the host server.

18. The at least one non-transitory computer-readable medium of claim 14, wherein the form of currency comprises a hard currency, and wherein the hard currency is transferred between the player's wallet and a third-party wallet upon receiving a request at the host server.

19. The at least one non-transitory computer-readable medium of claim 18, the hard currency corresponding to real-world currency.

20. The at least one non-transitory computer-readable medium of claim 14, wherein the player account is hosted on a player server and backed up on the host server.

* * * * *